(12) United States Patent
Takayama et al.

(10) Patent No.: US 6,522,499 B1
(45) Date of Patent: Feb. 18, 2003

(54) MAGNETIC HEAD AND MAGNETIC HEAD ASSEMBLY WITH CONDUCTIVE SPRING MEMBERS

(75) Inventors: Jun Takayama, Tokyo (JP); Yasuo Sugizaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/520,986

(22) Filed: Mar. 8, 2000

(30) Foreign Application Priority Data

Mar. 12, 1999 (JP) .......................................... 11-067029

(51) Int. Cl.⁷ .......................... G11B 5/105; G11B 5/265; G11B 5/29; G11B 5/50
(52) U.S. Cl. ....................... 360/129; 360/121; 360/241; 360/241.1
(58) Field of Search ................................ 360/129, 121, 360/241, 241.1

(56) References Cited

U.S. PATENT DOCUMENTS 5,218,498 A * 6/1993 Jagielinski .................. 360/121

FOREIGN PATENT DOCUMENTS

| EP | 0706076 A1 | | 4/1996 |
|----|------------|---|--------|
| JP | 02094019 | | 4/1990 |
| JP | 02-094019 | * | 4/1990 |
| WO | PCT WO96/16400 | | 5/1996 |

* cited by examiner

*Primary Examiner*—Craig A. Renner
(74) *Attorney, Agent, or Firm*—Sonnenschein, Nath & Rosenthal

(57) ABSTRACT

The present invention provides a magnetic head including a plurality of magnetic head elements disposed on a head support in a direction across a magnetic tape and a plurality of connection terminals disposed on the head support, for each of the magnetic head elements, in a direction perpendicular to the signal recording surface of the magnetic tape. Even a large number of magnetic head elements can be electrically connected to an external circuit in an appropriate and simple manner.

14 Claims, 22 Drawing Sheets

MAGNETIC HEAD AND MAGNETIC HEAD ASSEMBLY WITH CONDUCTIVE SPRING MEMBERS

BACKGROUND OF THE INVENTION

1. Field of the Invention

The present invention relates to a magnetic head including a plurality of magnetic head elements provided in a direction across a magnetic tape which is to be moved sliding on the magnetic head, and a magnetic head assembly including the magnetic head.

2. Description of the Related Art

Heretofore, there have been proposed many types of tape recording and/or playing systems using a magnetic tape as a recording medium. Such magnetic tape recording and/or playing systems include two major types. One is a helical scan type in which a magnetic head element is installed on a rotary drum which is driven to rotate rapidly, and a magnetic tape is to be set and moved sliding on the surface of the rotary drum. In this helical scan type magnetic tape recording and/or playing system, data is written to and/or read from the magnetic tape by the magnetic element sliding rapidly on the magnetic tape. The other is a linear scan type in which a magnetic head element is installed on a stationary head support and a magnetic tape is to be set and moved sliding on the stationary head support. For writing data to and/or reading data from the magnetic tape in this linear scan type magnetic tape recording and/or playing system, only the magnetic tape is moved sliding on the stationary magnetic heat element.

In the helical scan type magnetic tape recording and/or playing system, since the magnetic head element moves sliding rapidly on the magnetic tape which is also moving on the magnetic head element, the one moves at a high speed relative to the other, which contributes much to a high speed of data write and read on the one hand. On the other hand, however, the rapid sliding of the magnetic head element on the magnetic tape causes the magnetic head element to be abraded so much, which leads to a short light of the magnetic head element.

On the contrary, the linear scan type magnetic tape recording and/or playing system has the magnetic head element fixed on the stationary head support. The magnetic head element does not rapidly slide on the magnetic tape as in the helical scan type system. Hence, the magnetic head element will not be abraded so much and thus it can be used for a longer service life.

In the linear scan type magnetic tape recording and/or playing system, however, the magnetic head element is fixed or stationary and only the magnetic tape is moved during data write or read to or from the magnetic tape. Since the magnetic tape speed is not limitless, it is difficult to improve the relative speed at which the magnetic head element and magnetic tape are moved relative to each other.

For improving the data write and/or read speed independently of a relative speed at which the magnetic head element and magnetic tape are moved relative to each other in the linear scan type magnetic tape recording and/or playing system, it has been proposed to dispose many magnetic head elements in a direction across the magnetic tape for simultaneous data write or read to or from the magnetic tape by them.

In this case, however, since the magnetic tape has to be as wide as prescribed in the related standard, the more the magnetic head elements, the smaller the inter element space becomes. In a linear scan type magnetic tape recording and/or playing system, if so many magnetic head elements are provided as to attain a speed of data write or read equal to or higher than that in the helical scan type magnetic tape recording and/or playing system, the inter-element space will be very small, with a result that terminals for connection of the magnetic head elements to an external circuit have to be provided very closely to each other.

Assume here that the connection terminals are to be provided very closely to each other. In this case, however, if a conventional method such as wire bonding or the like is used to electrically connect the magnetic head elements to the external circuit, the bonding solder will possibly flow to between the neighboring connection terminals which will thus be electrically short-circuited between them.

OBJECT AND SUMMARY OF THE INVENTION

It is therefore an object of the present invention to overcome the above-mentioned drawbacks of the prior art by providing a magnetic head whose elements, even if they count a large number, can be electrically connected to an external circuit in an appropriate and simple manner, and also a magnetic head assembly including the magnetic head.

According to the present invention, there is provided a magnetic head including:

a head support disposed opposite to a signal recording surface of a magnetic tape which is to be moved sliding on the head support;

a number m (m is an integer equal to or larger than 2) of magnetic head elements disposed on the head support in a direction across the magnetic tape, with a part thereof being opposite to the signal recording surface of the magnetic tape; and a number n (n is an integer equal to or larger than 2) of connection terminals disposed on the head support, for each of the m magnetic head elements, to electrically connect the magnetic head elements to an external circuit. In the magnetic head, the n connection terminals provided for each of the m magnetic head elements are disposed in a direction perpendicular to the signal recording surface of the magnetic tape.

As aforementioned, the head support is disposed opposite to the signal recording surface of the magnetic tape which is to be moved sliding on the magnetic head. On the head support, a part of the m magnetic head elements are disposed opposite to the signal recording surface of the magnetic tape and across the magnetic tape. Thus, the m magnetic head elements can simultaneously act on as many tracks on the magnetic tape as the magnetic head elements.

Further, the n connection terminals are provided on the head support for each of the m magnetic head elements to electrically connect the magnetic head elements to an external circuit. More specifically, the connection terminals are electrically connected to the magnetic head elements by a wiring pattern. Each of the connection terminals has a conductive member. The conductive member of each connection terminal is electrically connected at one end thereof to the external circuit, whereby the external circuit is electrically connected to the magnetic head elements.

In the magnetic head according to the present invention, the n connection terminals provided for each of the m magnetic head elements are disposed in a direction perpendicular to the signal recording surface of the magnetic tape opposite to which the head support is disposed.

In the above magnetic head, since the n connection terminals for each of the m magnetic head elements are disposed in a direction perpendicular to the signal recording surface of the magnetic tape, the connection terminals can be disposed on the head support with an increased interval from one another. More specifically, there are disposed on the head support the m magnetic head elements in a direction across the magnetic tape. When the n connection terminals for each of the m magnetic head elements are disposed in the direction across the magnetic tape, a number m×n of connection terminals will be disposed in the direction across the magnetic tape. In this magnetic head, if a larger number m of magnetic head elements are provided, the connection terminals will be disposed with a decreased space between two successive ones and thus they cannot easily be connected to any external circuit.

In the magnetic head according to the present invention, the n connection terminals provided for each of the m magnetic head elements are disposed in the direction perpendicular to the signal recording surface of the magnetic tape, so that the connection terminals can be provided on the head support with an increased space between two successive ones. Thus, even a large number m of magnetic head elements can be electrically connected to an external circuit in an appropriate and simple manner.

Also, according to the present invention, there is provided a magnetic head assembly including:
  a magnetic head including:
    a head support disposed opposite to a signal recording surface of a magnetic tape which is to be moved sliding on the head support;
    a number m (m is an integer equal to or larger than 2) of magnetic head elements disposed on the head support in a direction across the magnetic tape, with a part thereof being opposite to the signal recording surface of the magnetic tape; and
    a number n (n is an integer equal to or larger than 2) of connection terminals disposed on the head support, for each of the m magnetic head elements, in a direction perpendicular to the signal recording surface of the magnetic tape, to electrically connect the magnetic head elements to an external;
  a number n of wiring boards each having a number m of wiring patterns formed thereon for the m magnetic head elements of the magnetic head;
  a number m×n of conductive spring members each having a first contact portion formed at one end thereof and which is to abut a corresponding one of the connection terminals of the magnetic head and a second contact portion formed at the other end thereof and which is to abut a corresponding one of the wiring patterns on the wiring board, to thereby provide an electrical connection between the connection terminal of the magnetic head and the wiring pattern on the wiring board; and
  a spring supporting member to support the m×n conductive spring members in such a manner that the neighboring conductive spring members are electrically isolated from each other.

As mentioned above, the head support of the magnetic head is disposed opposite to the signal recording surface of a magnetic tape which is to be moved sliding on the head support. On the head support, there is disposed a part of the m magnetic head elements opposite to the signal recording surface of the magnetic tape and in the direction across the magnetic tape. Thus, the magnetic head can have the m magnetic head elements write and/or read data to and/or from a number m of tracks on the magnetic tape at the same time.

Also, the magnetic head has provided on the head support the n connection terminals for each of the m magnetic head elements. Since the n connection terminals are disposed in the direction perpendicular to the signal recording surface of the magnetic tape opposite to which the head support is disposed, the connection terminals can be disposed on the head support with an increased space between two successive ones.

The first contact portion formed at one end of each conductive spring member is to abut the corresponding one of the m×n connection terminals of the magnetic head. The second contact portion, formed at the other end of the conductive spring member having provided at one end thereof the first contact portion which is to abut the corresponding one of the connection terminals of the magnetic head, is to abut the corresponding one of the wiring patterns on each wiring board. Thus, the connection terminals of the magnetic head are electrically connected to the corresponding ones of the wiring patterns of each wiring board by the conductive spring members.

The m×n conductive spring members are supported on the spring supporting member. The spring supporting member supports the m×n conductive spring members in such a manner that the m×n conductive spring members are electrically isolated from one another.

The wiring board has formed thereon the m wiring patterns for the m magnetic head elements of the magnetic head. For each of the m magnetic head elements, one of the connection terminals is electrically connected to a corresponding one of the m wiring patterns on each wiring board by a corresponding one of the conductive spring members. Namely, in the magnetic head assembly according to the present invention, there are provided the n wiring boards, and the m×n connection terminals (number n of connection terminals provided on each of the m magnetic head elements) are electrically connected to the wiring patterns formed on each of the n wiring boards by corresponding ones of the conductive spring members.

Each of the n wiring boards is connected to an external circuit such as a signal processing circuit which produces a recording signal to be written to the magnetic tape by the magnetic head element of the magnetic head or a read signal based on a data read from the magnetic tape by the magnetic head element. Therefore, in the magnetic head assembly according to the present invention, the magnetic head elements of the magnetic head will electrically be connected to the external circuit via the connection terminals, conductive spring member and wiring patterns of the wiring boards.

As in the above, in the magnetic head assembly, since the connection terminals of the magnetic head are disposed with a large space between two successive ones. The connection terminals and wiring patterns are electrically connected to each other with the first contact portion on the conductive spring member let to abut a corresponding one of the connection terminals of the magnetic bead while the second contact portion on the conductive spring member is let to abut a corresponding one of the wiring patterns on the wiring board. Each of the conductive spring members is supported on the spring supporting member which assures an electrical isolation between two successive conductive spring members. The m×n wiring patterns the n×m conductive spring members abut, respectively, are formed in a number m for each of the n wiring boards. These features contribute singly or in combination to an appropriate and simple electrical connection between the magnetic head elements of the magnetic head and an external circuit.

In the magnetic head assembly according to the present invention, the spring supporting member should preferably be formed by laminating a number n of portions for supporting at least the m conductive spring members together, or from a number m of portions for supporting at least the n conductive spring members.

Owing to the above-mentioned construction of the spring supporting member, the conductive spring members can easily be installed on the spring supporting member.

In the magnetic head assembly according to the present invention, the conductive spring member should preferably force the first contact portion to the connection terminal of the magnetic head to elastically deform and put the first contact portion into contact with the connection terminal while forcing the second contact portion to the wiring pattern on the wiring board to elastically deform and put the second contact portion into contact with the wiring pattern.

Because of the above-mentioned construction, the conductive spring member can assure a good connection between the first contact portion and the connection terminal of the magnetic head, and also a good connection between the second contact portion and the wiring pattern of the wiring board.

Also in the magnetic head assembly according to the present invention, the conductive spring member to be connected to a connection terminal corresponding to one of the magnetic head elements disposed adjacent to the magnetic head should preferably be different in length from the conductive spring member to be connected to a connection terminal corresponding to the other magnetic head element.

As in the magnetic head assembly according to the present invention, the conductive spring members to be connected to connection terminals corresponding to the magnetic head elements disposed side by side are different in length from each other, the connection terminals can be disposed on the head support with a further increased space between two successive ones.

Also in the magnetic head assembly according to the present invention, the spring supporting member should preferably have formed therein a plurality of recesses corresponding to the conductive spring members which the spring supporting member supports and in which the conductive spring members are received, respectively, in such a manner that only the first and second contact portions can be moved.

As mentioned above, the conductive spring members are received in the respective recesses formed in the spring supporting member and thus other portions than the first and second contact portions are blocked against movement so that the neighboring conductive spring members can be prevented from being put into contact with each other and thus it is possible to prevent any electrical short circuit from taking place between the neighboring conductive spring members.

Also in the magnetic head assembly according to the present invention, one of the neighboring wiring patterns formed on the wiring board should preferably extending from one to the other end thereof on one main side of the wiring board while the other should preferably be led at the middle portion thereof to the other main side of the wiring board via a through-hole formed in the wiring board.

As the wiring patterns are formed on the wiring board as mentioned above, the wiring patterns can be formed with an increased space between two successive ones so that an electrical short circuit can be prevented from taking place between the neighboring wiring patterns.

In the magnetic head assembly according to the present invention, there should preferably be formed a recess in a place on the wiring board where there lies the one end of the wiring pattern the second contact portion of the conductive spring member abuts.

The recess formed in the place where the one end of the wiring pattern on the wiring board lies assures an improved electrical connection of the second contact portion on the conductive spring member with the one end of the wiring pattern.

Also the magnetic head assembly according to the present invention should preferably include a plurality of magnetic heads which permit to write and/or read data to and/or from many tracks on a magnetic tape at the same time.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

The present invention can attain an improved speed of recording and/or reproduction, it is advantageously applicable to a magnetic head assembly for use in a linear scan type magnetic tape recording and/or playing system which should preferably have an improved tape recording and/or playing speed. Therefore, a magnetic head assembly constructed for use in such a linear scan type magnetic tape recording and/or playing system will be described herein by way of example. It should be noted however the present invention is not limited to this example but may be constructed as a magnetic head assembly for use in a helical scan type magnetic tape recording and/or playing system, for example.

Also, the present invention will be described herebelow concerning a composite magnetic head assembly formed by laminating together magneto-resistance effect type magnetic head elements as a read head and magnetic induction type magnetic head elements as a write head. However, the present invention is not limited to this type of magnetic head assembly but applicable to magnetic head assemblies using magnetic head elements of all types.

<First embodiment>

Referring now to FIGS. 1 to 19, there will be illustrated a first embodiment of the magnetic head assembly according to the present invention.

The magnetic head assembly according to the first embodiment of the present invention is generally indicated with a reference 1. As will be seen from FIGS. 1 to 3, the magnetic head assembly 1 consists of a pair of right and left half blocks 2 and 3 formed to have the same shape and joined integrally to each other with screws (not shown).

Figure 4:
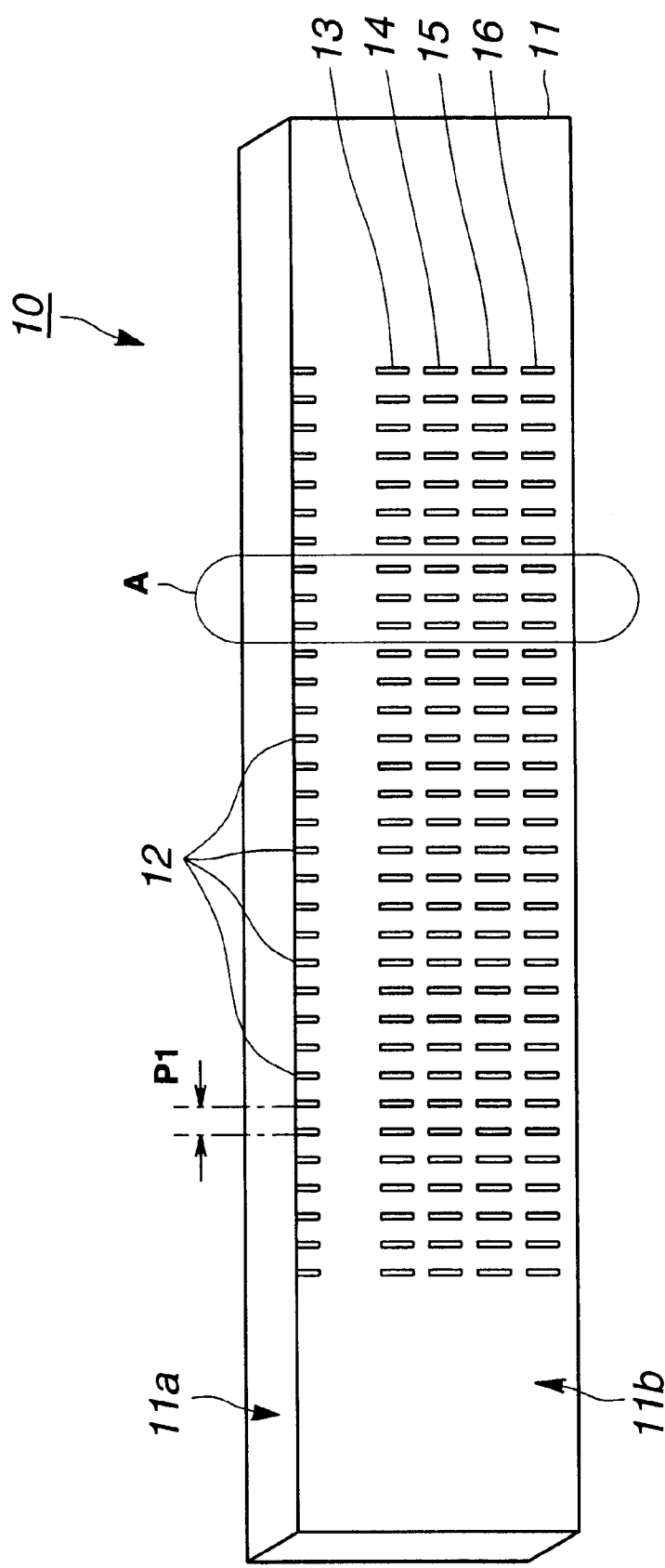
FIG. 4 is a perspective view of the magnetic head included in the magnetic head assembly according to the present invention.
Figure 5:
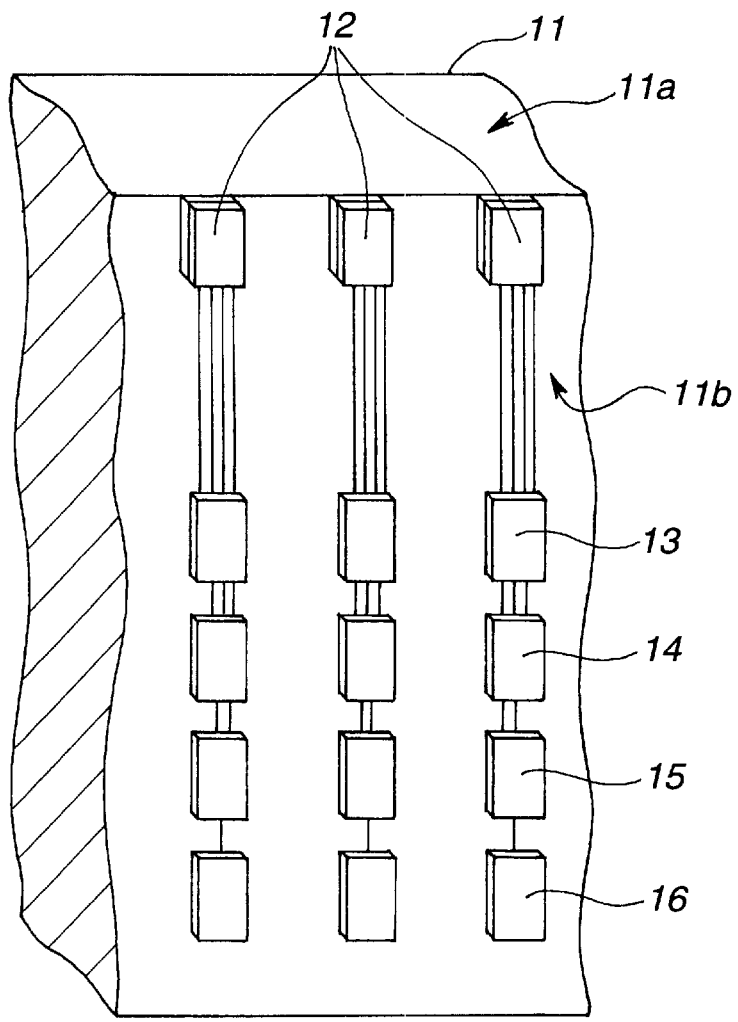
FIG. 5 is a perspective view, enlarged in scale, of the portion A in FIG. 4.

Each of the right and left half blocks 2 and 3 in pair includes a magnetic head 10 which writes and reads data to and from a magnetic tape 100. As shown in FIG. 4, the magnetic head 10 includes a head support 11 designed to have the form of a generally rectangular parallelopiped and formed from a nonmagnetic material such as CaO—TiO$_2$—NiO, having an excellent abrasion resistance and a good slidability on the magnetic tape 100. The head support 11 is longitudinal in a direction perpendicular to the direction of arrow A in which the magnetic tape 100 is moved sliding. The head support 11 is supported in a frame 4 in such a manner that one surface thereof (tape sliding surface 11a) is to face a signal recording surface 101 of the magnetic tape 100.

In addition to the surface 11a, the head support 11 has a surface 11b thereof extending perpendicularly to the tape sliding surface 11a. There are provided on the surface 11b of the head support 11 a plurality of magnetic head elements 12. Each of the magnetic head elements 12 is located in the surface 11b of the head support 11 to be near the magnetic tape 100. The magnetic head element 12 is to be put at a part thereof into contact with the signal recording surface 101 of the magnetic tape 100 during write or read of data to or from the magnetic tape 100. The plurality of magnetic head elements 12 is arrayed linearly in a direction perpendicular to the length of the head support 11, that is, in a direction perpendicular to the running direction A of the magnetic tape 100, namely, in a direction across the magnetic tape 100. The magnetic head elements 12 are arrayed at a very small pitch P1, 100 μm for example.

Each of the magnetic head elements 12 formed on the head support 11 is a composite magnetic head element formed by laminating together a magneto-resistance effect type magnetic head element for use to read data from the magnetic tape 100 and a magnetic induction type magnetic head element for use to write data to the magnetic tape 100.

There are provided on the surface 11b of the head support 11 perpendicular to the tape sliding surface 11a four connection terminals (first one 13, second one 14, third one 15 and fourth one 16) for each of the magnetic head elements 12. These connection terminals 13 to 16 are exposed. The connection terminals 13 to 16 are provided to connect the magnetic head element 12 to an external circuit (not shown). Of them, the first and second ones 13 and 14 are used with the magneto-resistance effect type magnetic head element, while the third and fourth ones 15 and 16 are used with the magnetic induction type magnetic head element. For each of the magnetic head elements 12, the connection terminals 13 to 16 are disposed linearly at a predetermined pitch P2 on the head support 11 in a direction perpendicular to the signal recording surface 101 of the magnetic tape 100.

As mentioned above, in the magnetic head 10, since for each of the plurality of magnetic head elements 12 disposed in the direction across the magnetic tape 100, the four connection terminals 13 to 16 are arrayed linearly in the direction perpendicular to the signal recording surface 101 of the magnetic tape 100, the area of the surface 11b of the head support 11 perpendicular to the tape sliding surface 11a can be effectively used for the space between the neighboring connection terminals to be as large as possible.

Figure 6:
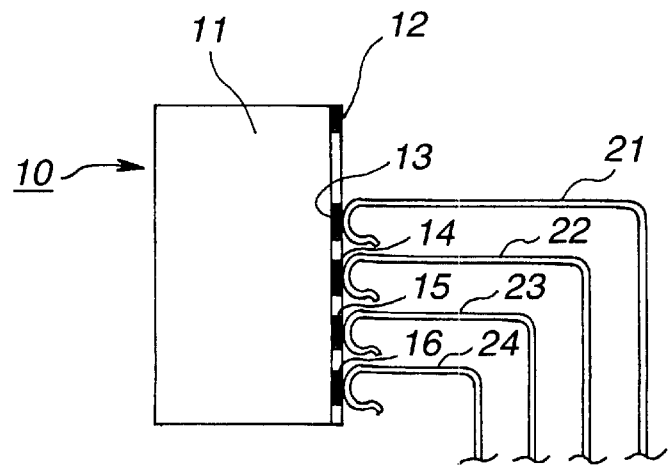
FIG. 6 is a side elevation of the magnetic head, showing the conductive spring members connected to the connection terminals, respectively.
Figure 7:
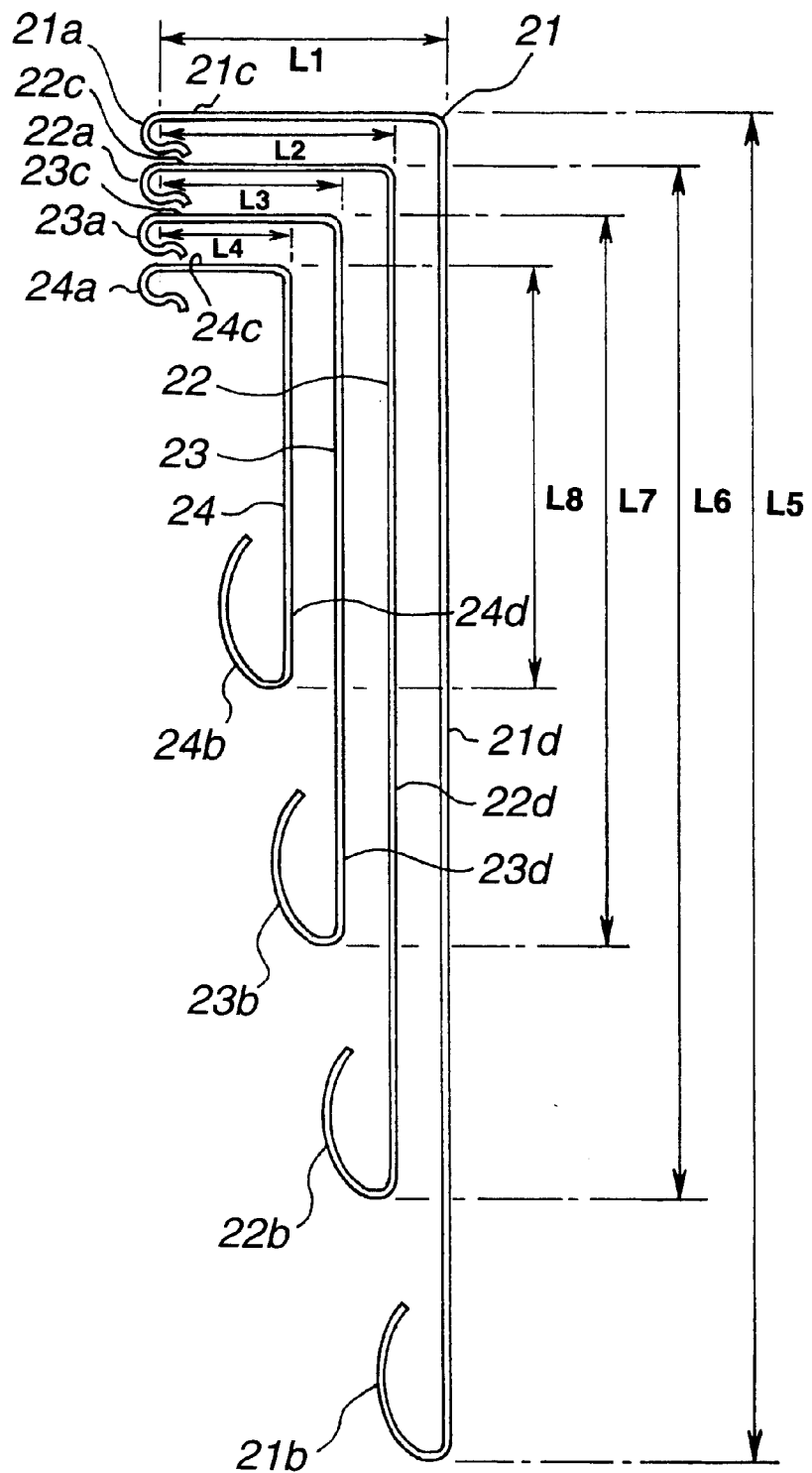
FIG. 7 is a side elevation of the first to fourth conductive spring members.

As shown in FIG. 6, there are provided four types of conductive spring members 21 to 24 made of a metallic material showing an excellent conductivity and a predetermined strength which abut at one ends thereof the first to fourth connection terminals 13 to 16, respectively, provided on the head support 11 for each of the plurality of magnetic head elements 12. The metallic material of the conductive spring members 21 to 24 has a circular or rectangular section. They are bent to a generally L shape as shown in FIG. 7. The conductive spring members 21 to 24 are folded back at the opposite ends thereof to elastically deform. The folded-back ends provide first contact portions 21a to 24a and second contact portions 21b to 24b.

Of the four types of conductive spring members 21 to 24, the first contact portions 21a to 24a are identical in shape to each other and also the second contact portions 21b to 24b has one and the same shape. The conductive spring members 21 to 24 have first straight portions 21c to 24c and second straight portions 21d to 24d, respectively, between the first contact portions 21a to 24a and second contact portions 21b to 24b, respectively. The first straight portions 21c to 24c are different in length from each other, and also the second straight portions 21d to 24d are different in length from each other. More specifically, on the assumption that the first straight portion 21c of the first conductive spring member 21 has a length L1, the first straight portion 22c of the second conductive spring member 22 has a length L2, the first straight portion 23c of the third conductive spring member 23 has a length L3 and the first straight portion 24c of the fourth conductive spring member 24 has a length L4, there is a relationship in length of L1>L2>L3>L4 among the straight portions 21c to 24c. Also, on the assumption that the second straight portion 21d of the first conductive spring member 21 has a length L5, the second straight portion 22d of the second conductive spring member 22 has a length L6, the second straight portion 23d of the third conductive spring member 23 has a length L7 and the second straight portion 24d of the fourth conductive spring member 24 has a length L8, there is a relationship in length of L5>L6>L7>L8 among the straight portions 21d to 24d.

In the magnetic head assembly 1 according to the first embodiment of the present invention, the four types of conductive spring members 21 to 24 count the same number as the magnetic head elements 12 provided on the head support 11. The first contact portion 21a of the first conductive spring member 21 abuts the first one 13 of the four connection terminals for the magnetic head elements 12, respectively, the first contact portion 22a of the second conductive spring member 22 abuts the second connection terminal 14, the first contact portion 23a of the third conductive spring member 23 abuts the third connection terminal 15, and the first contact portion 24a of the fourth conductive spring member 24 abuts the four connection terminal 16.

Figure 8:
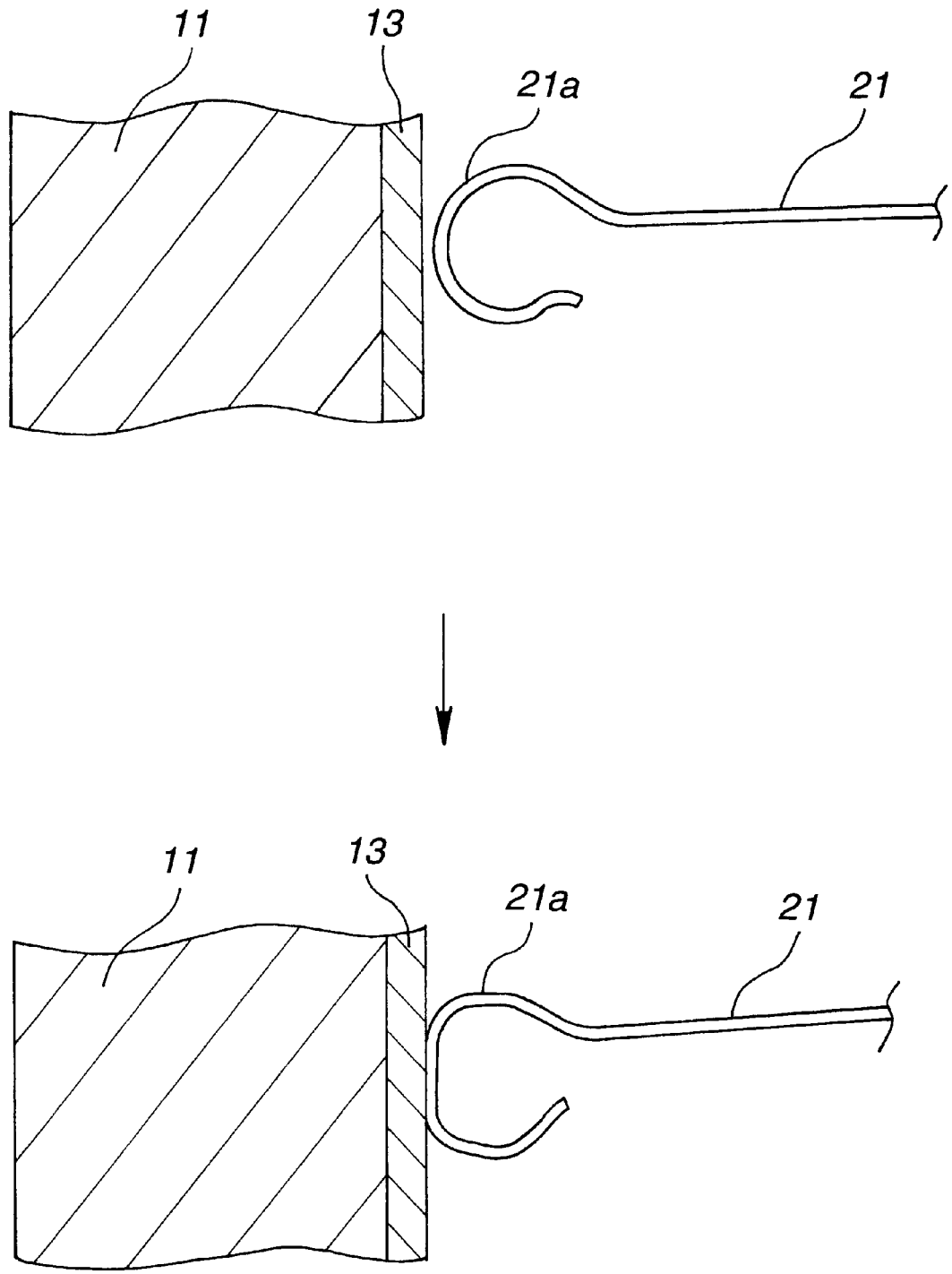
FIG. 8 is a schematic diagram showing the first contact portion of the conductive spring member abutting the terminal of the magnetic head.

The conductive spring members 21 to 24 are forced at the first ends thereof to the first to fourth connection terminals 13 to 16, respectively, and elastically deform the first contact portions 21a to 24a as shown in FIG. 8. While being thus elastically deformed, the first contact portions 21a to 24a will abut the first to fourth connection terminals 13 to 16, respectively, whereby the first contact portions 21a to 24a of the conductive spring members 21 to 24, respectively, are put in contact with the first to fourth connection terminals 13 to 16, respectively, under a predetermined pressure. Thus there is attained a wide area of contact of the contact portion with the connection terminal, which assures a good electrical connection. Note that FIG. 8 shows only the first connection terminal 13 for the simplicity of illustration.

Figure 9:
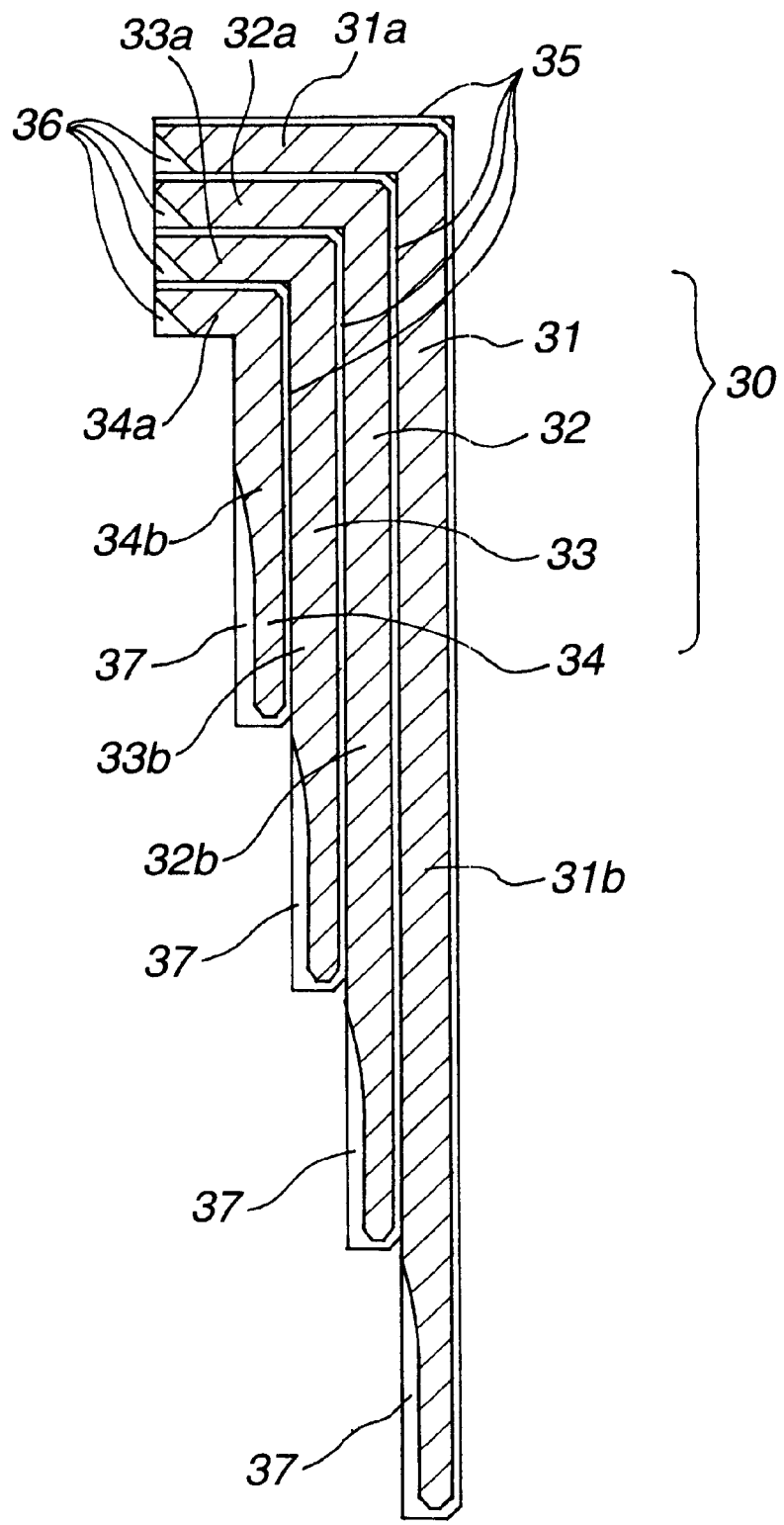
FIG. 9 is an axial-sectional view of the spring holder supporting the conductive spring member.

The first to fourth conductive spring members 21 to 24 are supported on a spring holder 30. As shown in FIG. 9, the spring holder 30 consists of a first supporting member 31 to support together a plurality of conductive spring members 21 for the plurality of magnetic head elements 12, a second supporting member 32 to support together a plurality of conductive spring members 22, a third supporting member 33 to support together a plurality of conductive spring members 23, and a fourth supporting member 34 to support together a plurality of conductive spring members 24.

Each of the first to fourth supporting members 31 to 34 is made of a material superior in insulation performance such as synthetic resin, glass, ceramic and formed like a plate having a generally L-shaped section.

Figure 10:
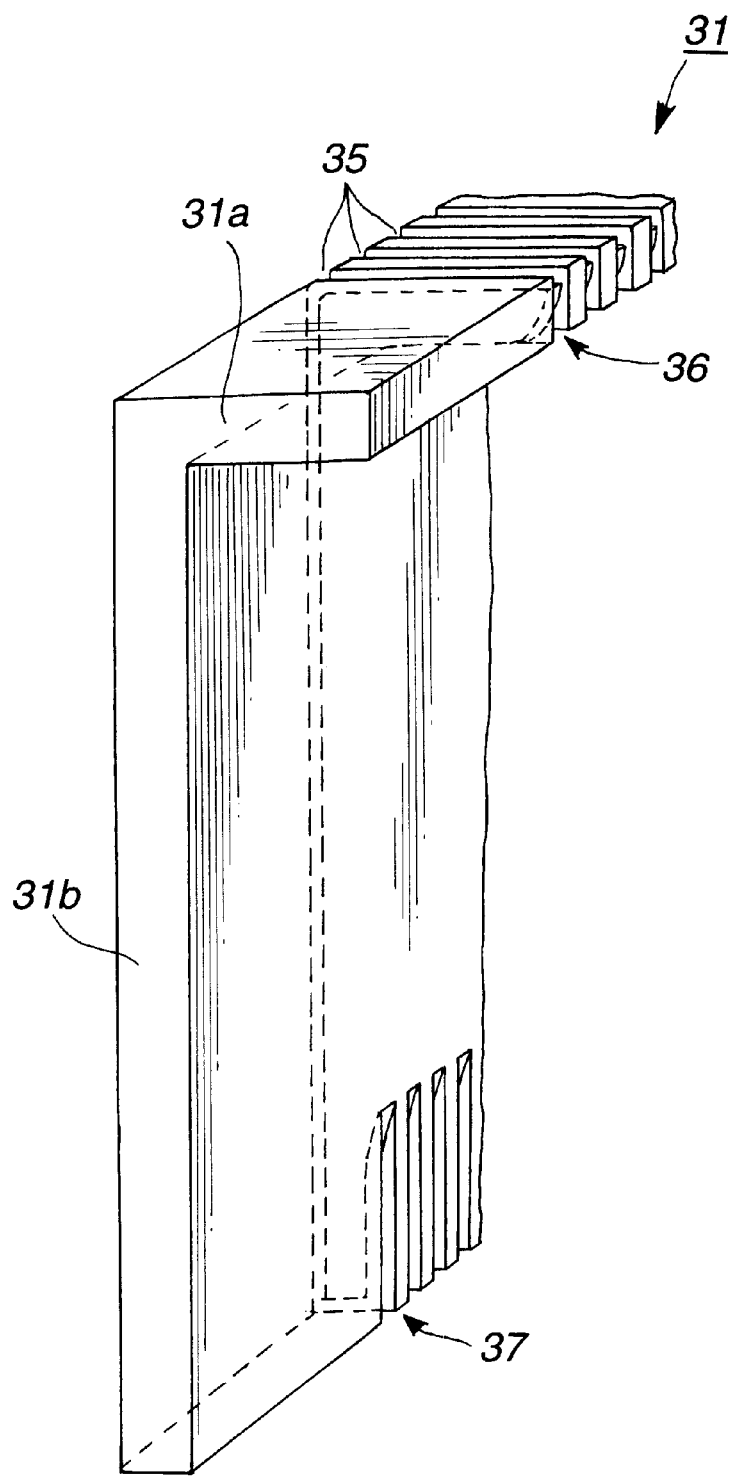
FIG. 10 is a perspective view, enlarged in scale, of a part of the first supporting member composing the spring holder.

More specifically, the first supporting member 31 consists of a first supporting portion 31a formed to have a length nearly equal to the length L1 of the first straight portion 21c of the first conductive spring member 21 and which supports the first straight portion 21c and first contact portion 21a, and a second supporting portion 31b formed to have a length nearly equal to the length L5 of the second straight portion 21d of the first conductive spring member 21 and which supports the second straight portion 21d and second contact portion 21b, as shown in FIG. 10. There are formed in the main outer surface of the first supporting member 31 so many recesses 35 as the first conductive spring members 21 to be supported by the first supporting member 31. The recesses 35 are provided at a pitch nearly same as the pitch P1 of the magnetic head elements 12 provided on the head support 11. Receiving the first conductive spring members 21 in the respective recesses 35 in the main outer surface, the first supporting member 31 will limit the movement of other than the first and second contact portions 21a and 21b of the first conductive spring member 21, thereby assuring the insulation between the neighboring conductive spring members 21 and supporting together the plurality of conductive spring members 21.

There is formed in the end of the first supporting portion 31a of the first supporting member 31 an engagement concavity 36 in which there is engaged the first contact portion 21a of the first conductive spring member 21 received in the recess 35. The engagement concavity 36 is provided for each of the recesses 35. When the first contact portion 21a of the first spring member 21 abuts the first connection terminal 13 provided on the head support 11, it is elastically deformed in the engagement concavity 36 and kept in a good electrical connection with the first connection terminal 13.

Further, there is formed in the end of the second supporting portion 31b of the first supporting member 31 an engagement concavity 37 in which there is engaged the second contact portion 21b of the first contact spring member 21 received in the recess 35. The engagement concavity 37 is provided for each of the recesses 35. The second contact portion 21b is elastically deformable in the engagement concavity 37.

Also, the second supporting member 32 consists of a first supporting portion 32a formed to have a length nearly equal to the length L2 of the first straight portion 22c of the second conductive spring member 22 and which supports the first straight portion 22c and first contact portion 22a, and a second supporting portion 32b formed to have a length nearly equal to the length L6 of the second straight portion 22d of the second conductive spring member 22 and which supports the second straight portion 22d and second contact portion 22b. There are formed in the main outer surface of the second supporting member 32 so many recesses 35 as the second conductive spring members 22 to be supported by the second supporting member 32. The recesses 35 are provided at a pitch nearly same as the pitch P1 of the magnetic head elements 12 provided on the head support 11. Receiving the second conductive spring members 22 in the respective recesses 35 in the main outer surface, the second supporting member 32 will limit the movement of other than the first and second contact portions 22a and 22b of the second conductive spring member 22, thereby assuring the insulation between the neighboring conductive spring members 22 and supporting together the plurality of conductive spring members 22.

Also, there is formed in the end of the first supporting portion 32a of the second supporting member 32 an engagement concavity 36 in which there is engaged the first contact portion 22a of the second conductive spring member 22 received in the recess 35. The engagement concavity 36 is provided for each of the recesses 35. When the first contact portion 22a of the second conductive spring member 22 abuts the second connection terminal 14 provided on the head support 11, it is elastically deformed in the engagement concavity 36 and kept in a good electrical connection with the second connection terminal 14.

Further, there is formed in the end of the second supporting portion 32b of the second supporting member 32 an engagement concavity 37 in which there is engaged the second contact portion 22b of the second conductive spring member 22 received in the recess 35. The engagement concavity 37 is provided for each of the recesses 35. The second contact portion 22b is elastically deformable in the engagement concavity 37.

Also, the third supporting member 33 consists of a first supporting portion 33a formed to have a length nearly equal to the length L3 of the first straight portion 23c of the third conductive spring member 23 and which supports the first straight portion 23c and first contact portion 23a, and a second supporting portion 33b formed to have a length nearly equal to the length L7 of the second straight portion 23d of the third conductive spring member 23 and which supports the second straight portion 23d and second contact portion 23b. There are formed in the main outer surface of the third supporting member 33 so many recesses 35 as the third conductive spring members 23 to be supported by the third supporting member 33. The recesses 35 are provided at a pitch nearly same as the pitch P1 of the magnetic head elements 12 provided on the head support 11. Receiving the third conductive spring members 23 in the respective recesses 35 in the main outer surface, the third supporting member 33 will limit the movement of other than the first and second contact portions 23a and 23b of the third conductive spring member 23, thereby assuring the insulation between the neighboring conductive spring members 23 and supporting together the plurality of conductive spring members 23.

Also, there is formed in the end of the first supporting portion 33a of the third supporting member 33 an engagement concavity 36 in which there is engaged the first contact portion 23a of the third conductive spring member 23 received in the recess 35. The engagement concavity 36 is provided for each of the recesses 35. When the first contact portion 23a of the third conductive spring member 23 abuts the third connection terminal 15 provided on the head support 11, it is elastically deformed in the engagement concavity 36 and kept in a good electrical connection with the third connection terminal 15.

Further, there is formed in the end of the second supporting portion 33b of the third supporting member 33 an engagement concavity 37 in which there is engaged the second contact portion 23b of the third conductive spring member 23 received in the recess 35. The engagement concavity 37 is provided for each of the recesses 35. The second contact portion 23b is elastically deformable in the engagement concavity 37.

Also, the fourth supporting member 34 consists of a first supporting portion 34a formed to have a length nearly equal to the length L4 of the first straight portion 24c of the fourth conductive spring member 24 and which supports the first straight portion 24c and first contact portion 24a, and a second supporting portion 34b formed to have a length nearly equal to the length L8 of the second straight portion 24d of the fourth conductive spring member 24 and which supports the second straight portion 24d and second contact portion 24b. There are formed in the main outer surface of the fourth supporting member 34 so many recesses 35 as the fourth conductive spring members 24 to be supported by the fourth supporting member 34. The recesses 35 are provided at a pitch nearly same as the pitch P1 of the magnetic head elements 12 provided on the head support 11. Receiving the fourth conductive spring members 24 in the respective recesses 35 in the main outer surface, the fourth supporting member 34 will limit the movement of other than the first and second contact portions 24a and 24b of the fourth conductive spring member, thereby assuring the insulation between the neighboring conductive spring members 24 and supporting together the plurality of conductive spring members 24.

Also, there is formed in the end of the first supporting portion 34a of the fourth supporting member 34 an engagement concavity 36 in which there is engaged the first contact portion 24a of the fourth conductive spring member 24 received in the recess 35. The engagement concavity 36 is provided for each of the recesses 35. When the first contact portion 24a of the fourth spring member 24 abuts the fourth connection terminal 16 provided on the head support 11, it is elastically deformed in the engagement concavity 36 and kept in good electrical connection with the fourth connection terminal 16.

Further, there is formed in the end of the second supporting portion 34b of the fourth supporting member 34 an engagement concavity 37 in which there is engaged the second contact portion 24b of the fourth conductive spring member 24 received in the recess 35. The engagement concavity 37 is provide for each of the recesses 35. The second contact portion 24b is elastically deformable in the engagement concavity 37.

Each of the first to fourth supporting members 31 to 34 are formed to have a thickness nearly equal to the pitch P2 of the first to fourth connection terminals 13 to 16 arrayed linearly on the head support 11 in the direction across the signal recording surface 101 of the magnetic tape 100.

Figure 11:
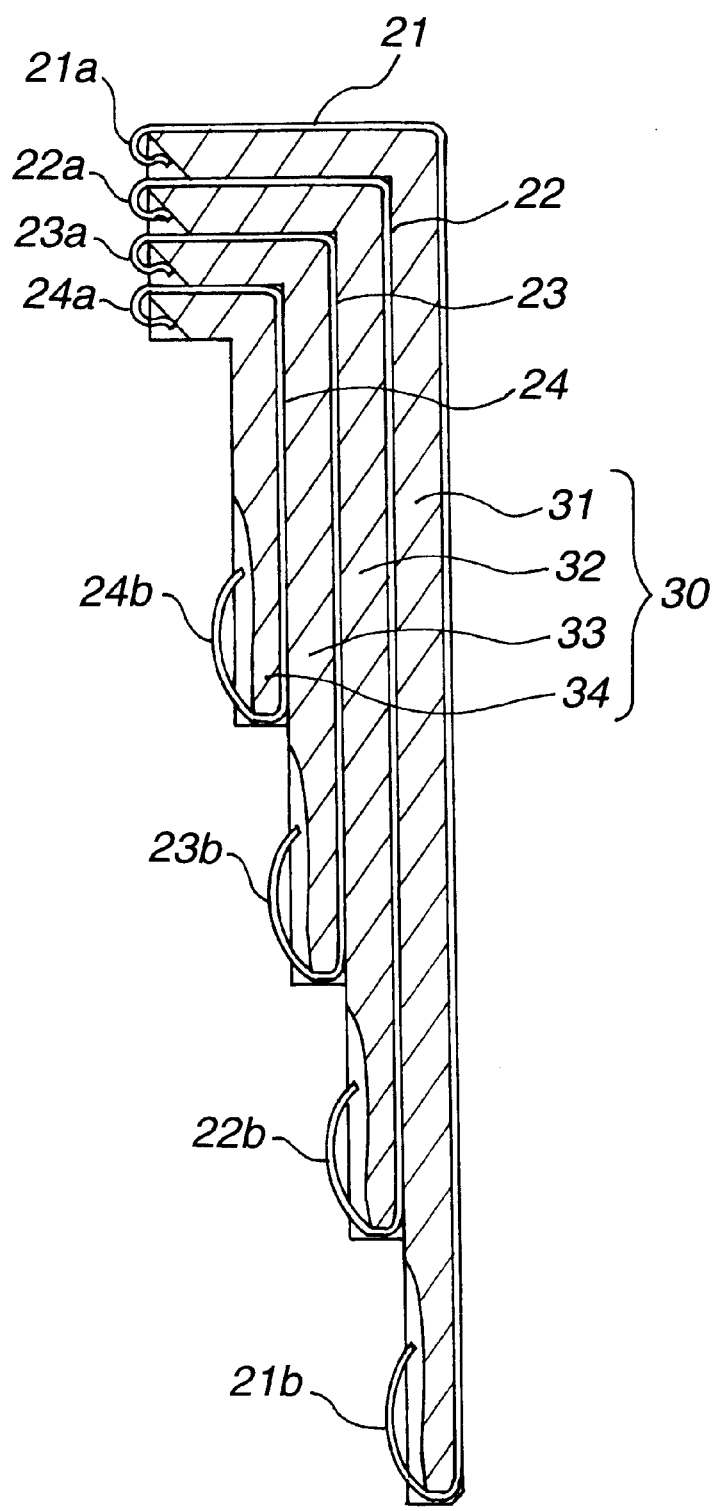
FIG. 11 is an axial-sectional view of the spring holder supporting the first to fourth conductive spring members.

As shown in FIG. 11, the spring holder 30 is formed by laminating together the first to fourth supporting members 31 to 34 with the plurality of first conductive spring members 21 being supported together by the first supporting member 31, the plurality of second conductive spring members 22 supported together by the second supporting member 32, the plurality of third conductive spring members 23 supported together by the third supporting members 33 and the plurality of fourth conductive spring members 24 supported together by the fourth supporting member 34. All the conductive spring members 21 to 24 are supported together by the spring holder 30 formed from the first to fourth supporting members 31 to 34 laminated together in the direction of their thickness while the insulation between the neighboring conductive spring members is thus assured by the spring holder 30.

The distribution of the first contact portions 21a to 24a of the first to fourth conductive spring members 21 to 24 supported by the spring holder 30 coincides with that of the first to fourth connection terminals 13 to 16 disposed on the head support 11. Thus, when all the first contact portions 21a to 24a of the conductive spring members 13 to 16 disposed on the spring holder 11 are forced to the first to fourth connection terminals 13 to 16, respectively, all the conductive spring members 21 to 24 can be connected together to the first to fourth connection terminals 13 to 16, respectively.

The spring holder 30 is installed to a spring holder fixing plate 5 with screws (not shown) with all the conductive spring members 21 to 24 being connected together to the first to fourth connection terminals 13 to 16, respectively.

Figure 1:
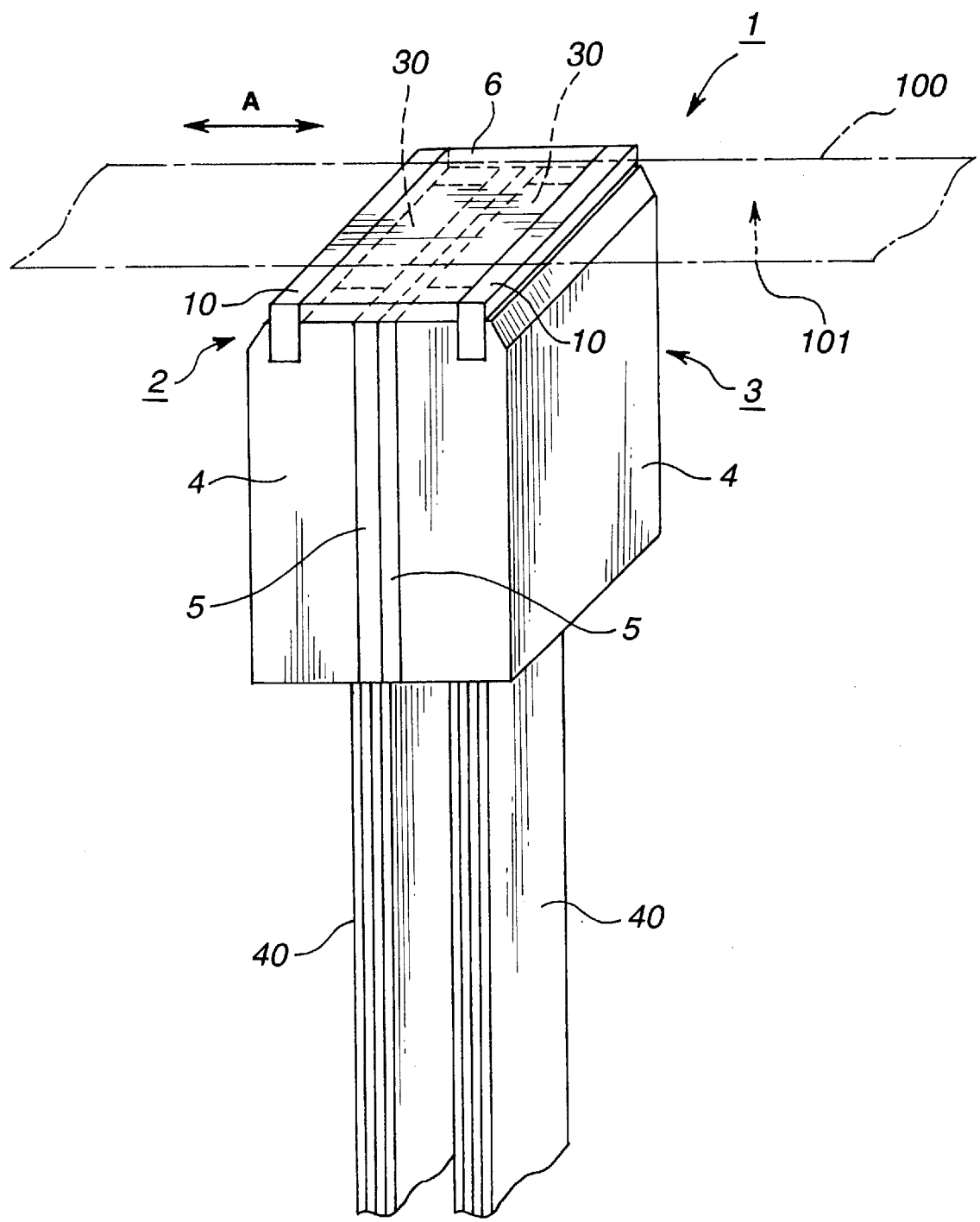
FIG. 1 is a perspective view of a first embodiment of the magnetic head assembly according to the present invention.
Figure 2:
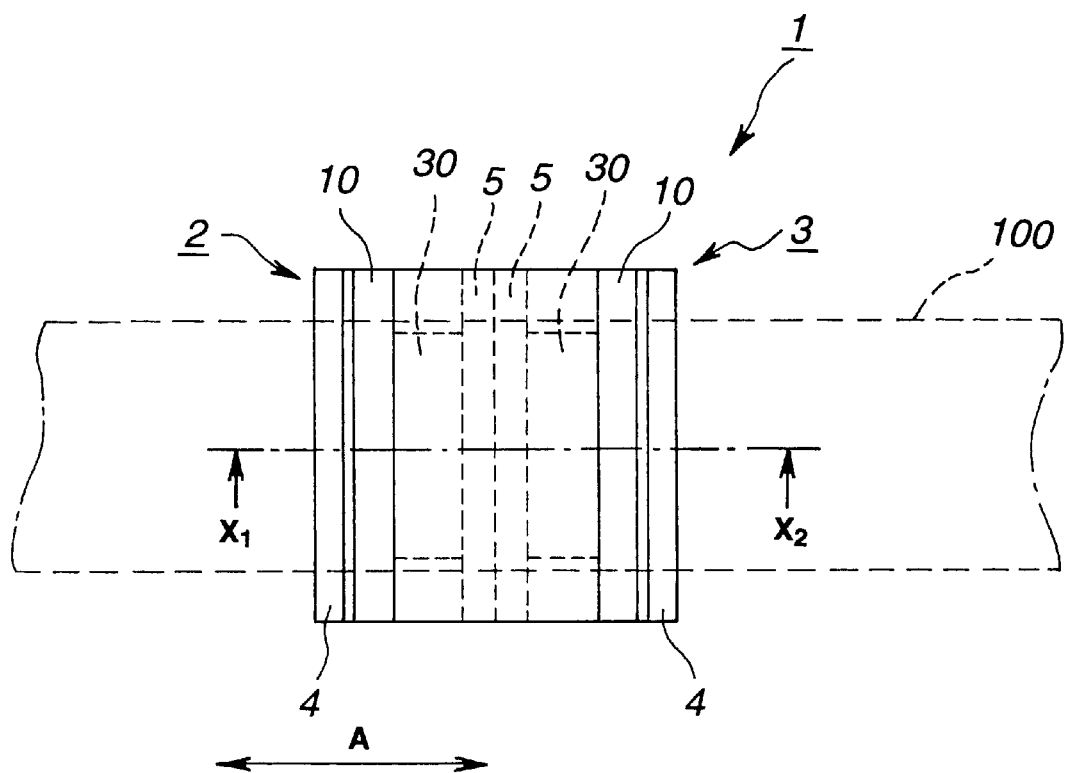
FIG. 2 is a plan view of the magnetic head assembly in FIG. 1.
Figure 3:
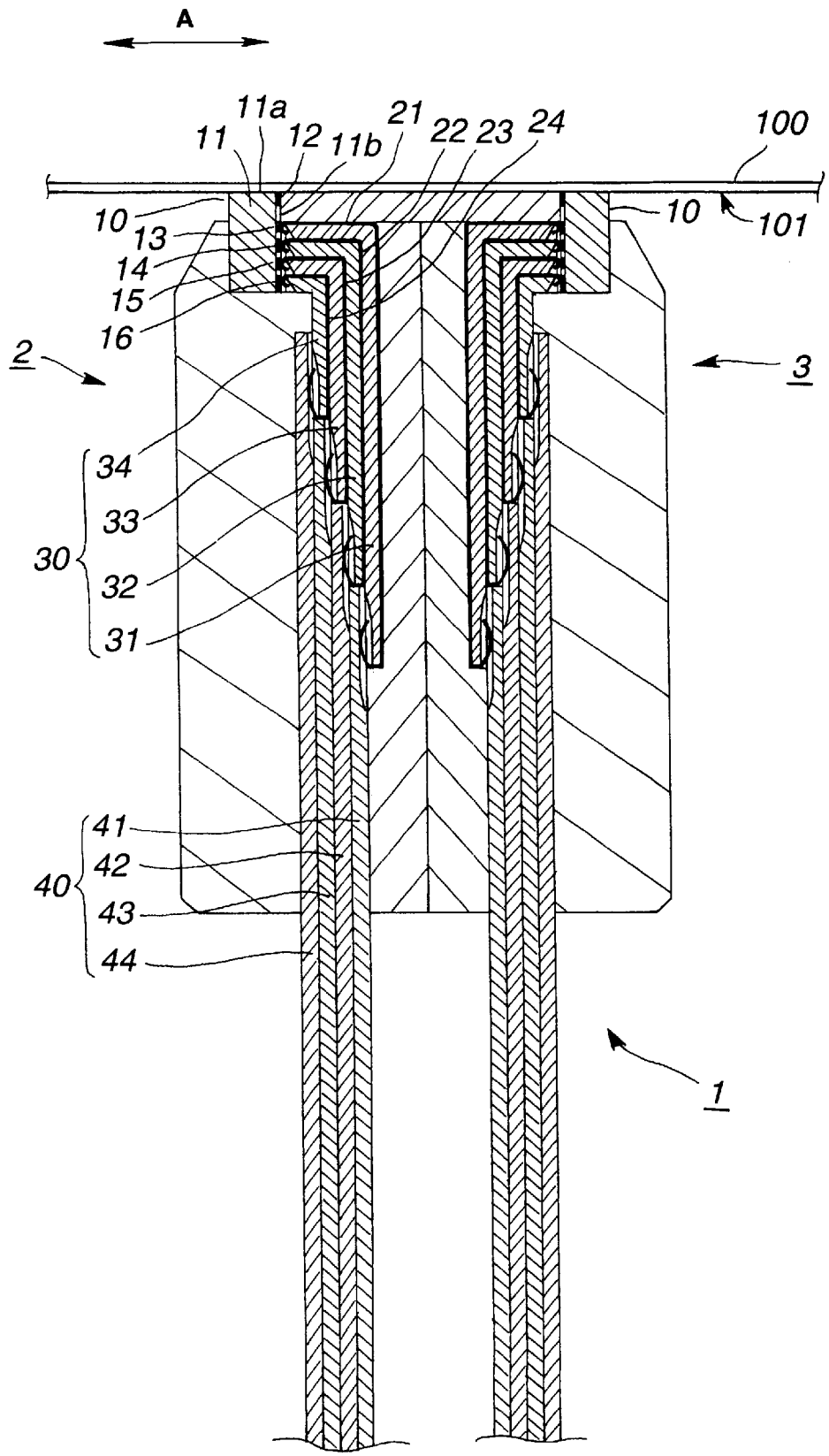
FIG. 3 is a axial-sectional view of the magnetic head assembly, taken along the line $X_1$–$X_2$ in FIG. 2.

As shown in FIGS. 1 and 3, each of the right and left half blocks 2 and 3 in pair forming a part of the magnetic head assembly 1 according to the first embodiment of the present invention is connected at one end thereof to the second contact portions 21b to 24b of the first to fourth conductive spring members 21 to 24 supported by the spring holder 30, and is provided at the other end with a wiring board assembly 40 for connection to an external circuit (not shown). The wiring board assembly 40 is formed from first to fourth wiring boards 41 to 44 laminated together. The second contact portion 21b of the first conductive spring member 21 is connected to one end of the first wiring board 41, the second contact portion 22b of the second conductive spring member 22 is connected to one end of the second wiring board 42, the second contact portion 23b of the third conductive spring member 23 is connected to one end of the third wiring board 43, and the second contact portion 24b of the fourth conductive spring member 24 is connected to one end of the fourth wiring board 44.

Figure 12:
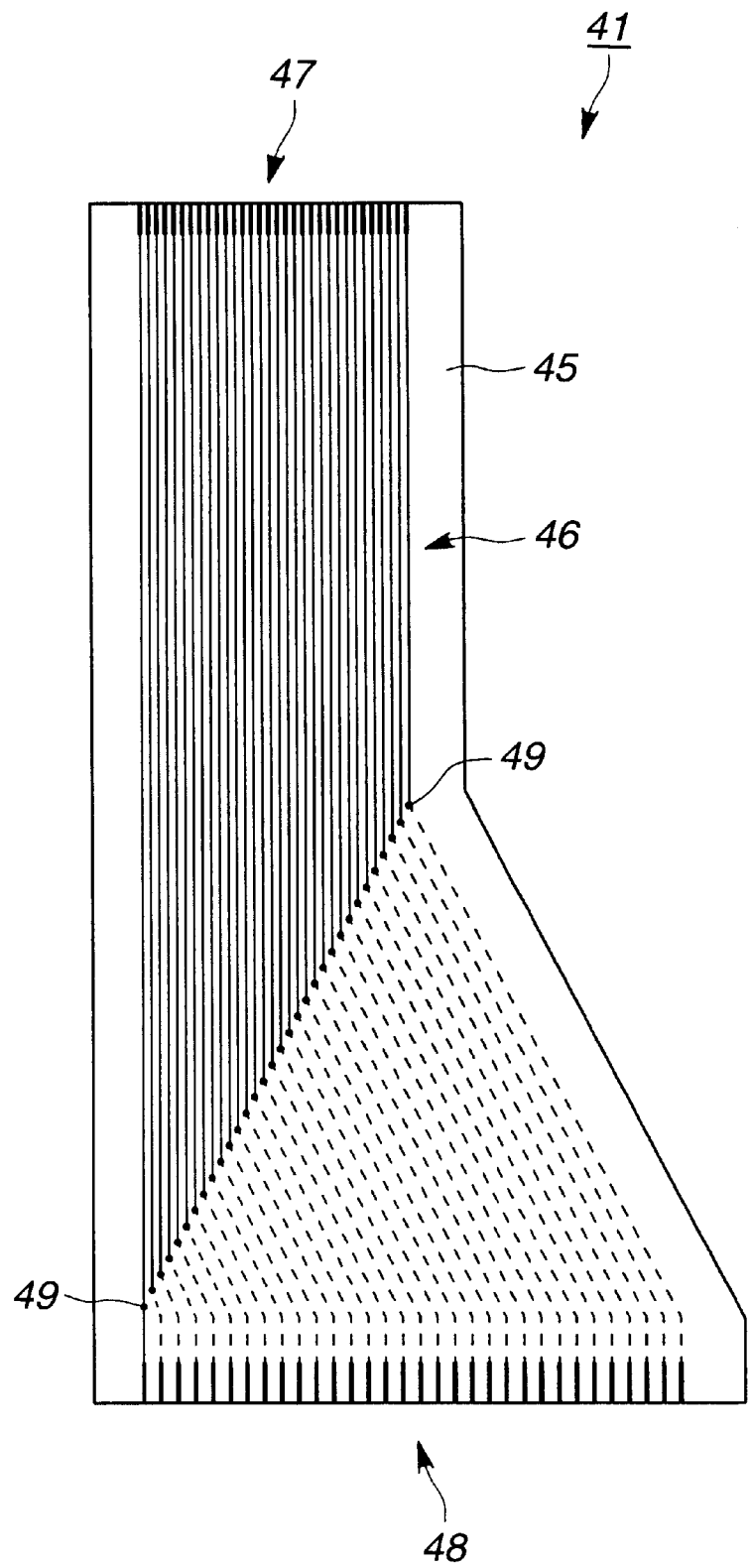
FIG. 12 is a plan view of the first wiring board composing the wiring board assembly.

As shown in FIG. 12, each of the wiring boards 41 to 44 forming together the wiring board assembly 40 has a highly insulative substrate 45 on which so many wiring patterns 46 as the magnetic head elements 12 provided on the head support 11. Note that only the first wiring board 41 will be described herebelow since the first to fourth wiring boards 41 to 44 are identical in configuration to each other.

The substrate 45 of the wiring board 41 consists of a parallel plate widened at the middle thereof and gradually increased in width as it goes away from the parallel portion. So many wiring patterns 46 as the magnetic head elements 12 are provided to extend from the narrow end of the substrate 45 to the wide end.

The wiring patterns 46 have first terminal portions 47 at the narrow end portion of the substrate 45 and second termnninal portions 48 at the wide end portion as shown. The pitch of the wiring patterns 46 is nearly equal to the pitch P1 of the magnetic head elements 12 provided on the head support 11, namely, the pitch of the first conductive spring members 21 supported by the first supporting member 31 forming a part of the spring holder 30.

The pitch of the wiring patterns 46 at the second terminal portions 48 thereof is larger than that at the first terminal portions 47. The second terminal portions 48 are electrically connected to the external circuit (not shown) by wire bonding or the like. In this magnetic head assembly 1, the pitch of the neighboring patterns 46 at the second terminal portions 48 thereof is large enough for an appropriate and simple connection to the external circuit.

Figure 13:
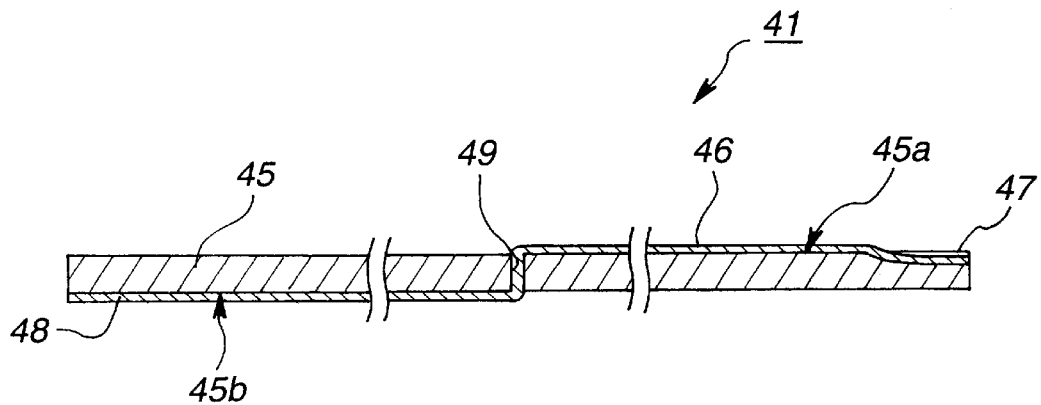
FIG. 13 is a sectional view of the first wiring board in FIG. 12.

The wiring patterns 46 are led from one main surface 45a of the substrate 45 to the other main surface via throughholes 49 formed in the substrate 45 correspondingly to each wiring pattern 46 as shown in FIG. 13. That is, each wiring pattern 46 has the first tenmunal portion 47 thereof located on the one main surface 45a of the substrate 45 and the second terminal portion 48 located on the other main surface 45b.

Figure 14:
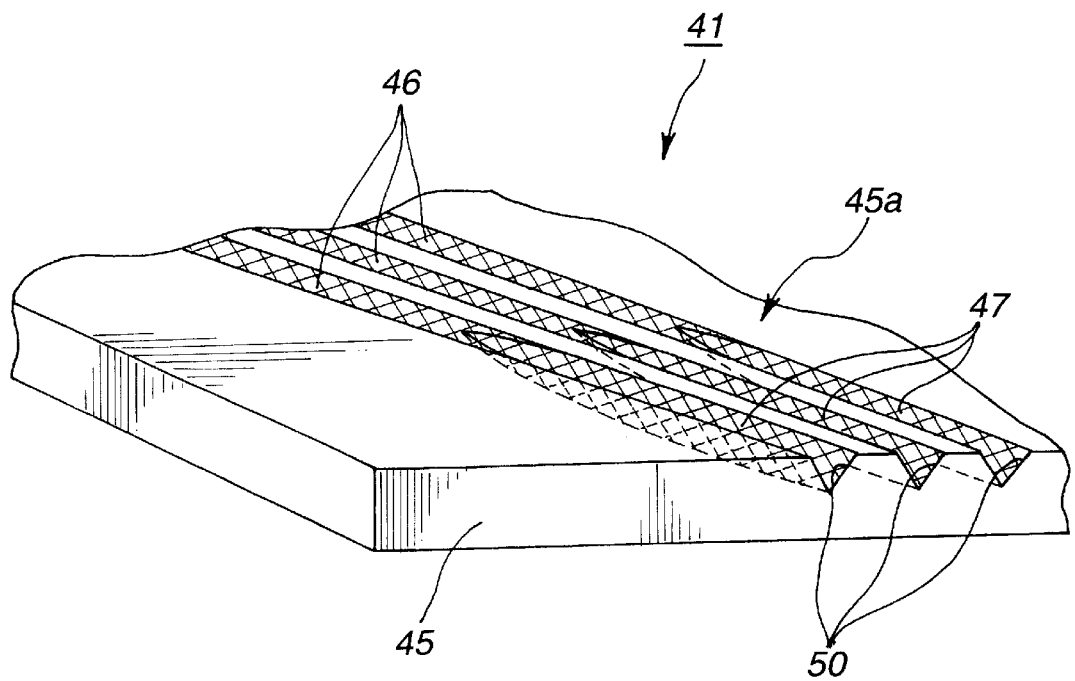
FIG. 14 is a perspective view, enlarged in scale, of a part of the first wiring board.
Figure 15:
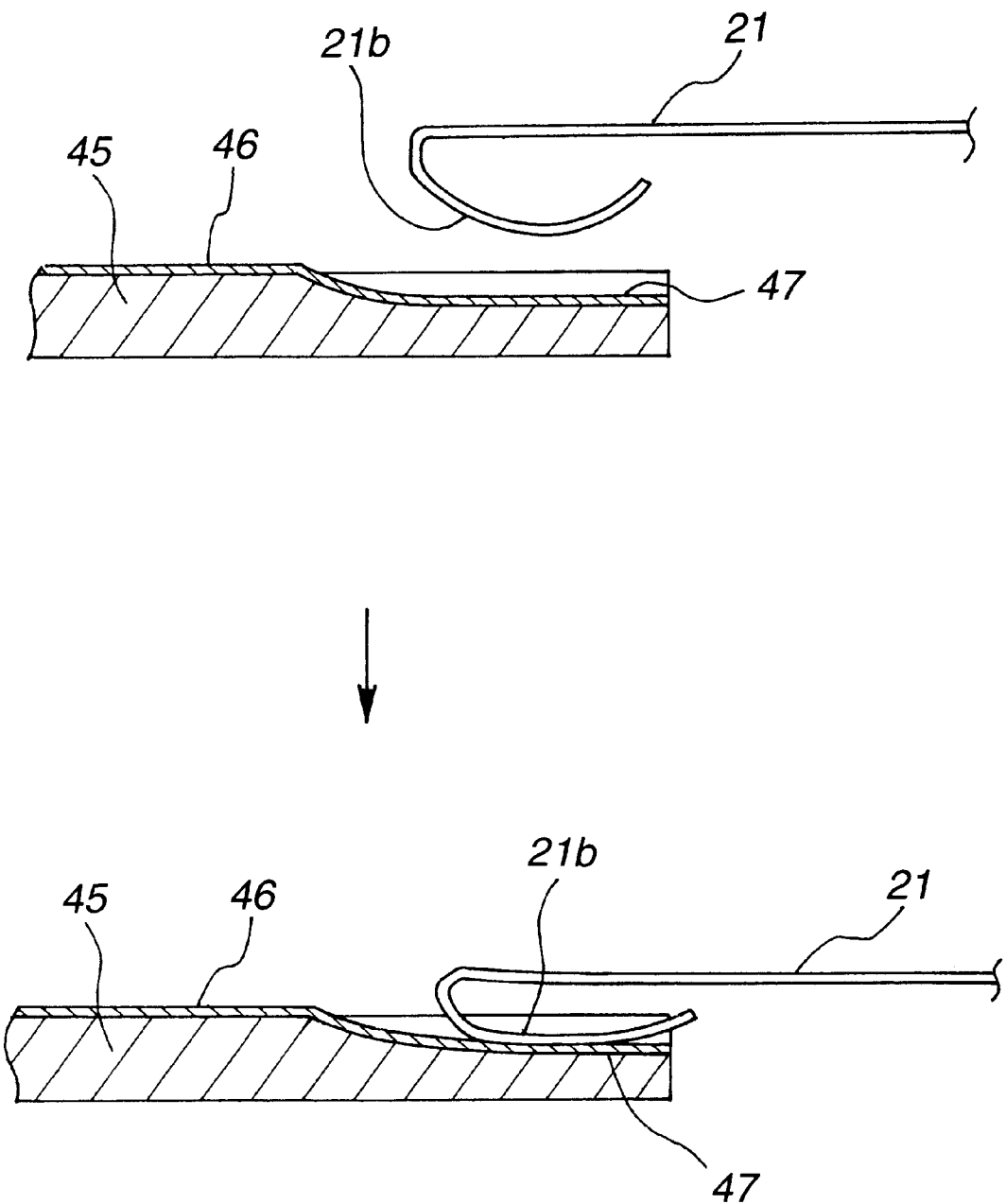
FIG. 15 is a schematic diagram of the second contact portions of the conductive spring members abutting the first terminal portions of the wiring patterns.

As shown in FIG. 14, there are formed recesses 50 in a portion of the one main surface 45a of the substrate 45 where the first terminal portions 47 of the wiring patterns 46 are formed. That is, the first terminal portions 47 of the wiring patterns 46 are formed inside the recesses 50 formed on the one main surface 45a of the substrate 45.

Each of the first to fourth wiring boards 41 to 44 is constructed as in the above. The wiring board assembly 40 is formed by assembling together the first to fourth wiring boards 41 to 44 with the other main surface 45b of the substrate 45 of the third wiring board 43 being joined to the one main surface 45a of the substrate 45 of the fourth wiring board 44, the other main surface 45b of the substrate 45 of the second wiring board 42 being joined to the one main surface 45a of the substrate 45 of the third wiring board 43, and the other main surface 45b of the substrate 45 of the first wiring board 41 being joined to the one main surface 45a of the substrate 45 of the second wiring board 42. At this time, the first to fourth wiring boards 41 to 44 are joined to each other with them being displaced from each other in the extending direction of the wiring patterns 46 a distance nearly equal to the space between the two successive ones of the second contact portions 21b to 24b of the first to fourth conductive spring members 21 to 24 supported by the spring holder 30. Thus, the first terminal portions 47 and second terminal portions 48 of the wiring patterns 46 on the first to fourth wiring boards 41 to 44 are exposed.

The second contact portions 21b to 24b of the first to fourth conductive spring members 21 to 24 held by the spring holder 30 abut the first terminal portions 47, respectively, of the wiring patterns 46 on the first to fourth wiring boards 41 to 44. More specifically, the second contacts 21b of the first conductive spring members 21 abut the first terminal portions 47, respectively, of the wiring patterns 46 of the first wiring board 41. The second contact portions 22b of the second conductive spring member 22 abut the first terminal portions 47, respectively, of the wiring patterns 46 of the second wiring board 42. The second contact portions 23b of the third conductive spring member 23 abut the first terminal portions 47, respectively, of the wiring patterns 46 on the third wiring board 43, and the second contact portion 24b of the fourth conductive spring member 24 abuts the first terminal portion 47 of each of the wiring pattern 46s on the fourth wiring board 44.

Then, as the conductive spring members 21 to 24 are forced at the other ends thereof where the second contact portions 21b to 24b are provided to the first terminal portions 47, respectively, of the wiring patterns 46 on the first to fourth wiring boards 41 to 44, the second contact portions 21b to 24b are elastically deformed and abut the first terminal portions 47, respectively, of the wiring patterns 46 on the first to fourth wiring boards 41 to 44. Namely, the second contact portions 21b to 24b of the conductive spring members 21 to 24 abut the first terminal portions 47, respectively, of the wiring patterns 46 on the first to fourth wiring boards 41 to 44 under a predetermined pressure. Thus, the area of contact is wide, which will assure a good electrical connection between the contact portions and terminal portions.

With the second contact portions 21b to 24b of the first to fourth conductive spring members 21 to 24 supported by the spring holder 30 being kept forced to abut the first terminal portions 47, respectively, of the wiring patterns 46 on the first to fourth wiring boards 41 to 44 as shown in FIGS. 1 and 3, the wiring board assembly 40 is fixed between the frame 4 and spring holder 5 with screws (not shown).

As having been described in the foregoing, the right and left half blocks 2 and 3 in pair forming the magnetic head assembly 1 according to the first embodiment are assembled together by supporting the magnetic head 10 in the frame 4, installing to the spring holder fixing plate 5 the spring holder 30 supporting the first to fourth conductive spring members 21 to 24, and fixing the wiring board assembly 40 between the frame 4 and spring holder fixing plate 5. Then, the first contact portions 21a to 24a of the first to fourth conductive spring members 21 to 24 are let to abut the first to fourth connection terminals 13 to 16, respectively, provided on the head support 11. The first contact portions 21b to 24b of the first to fourth conductive spring members 21 to 24 are let to abut the first terminal portions 47, respectively, of the wiring patterns 46 on the first to fourth wiring boards 41 to 44 of the wiring board assembly 40. The second terminal portions 48 of the wiring patterns 46 on the first to fourth wiring boards 41 to 44 included in the wiring board assembly 40 are connected to an external circuit (not shown). Thus, the magnetic head elements 12 of the magnetic head assembly 10 will electrically be connected to the external circuit (not shown) via the first to fourth connection terminals 13 to 16, first to fourth conductive members 21 to 24 and the wiring patterns 46 on the first to fourth wiring boards 41 to 44, respectively.

Thereafter the right and left half blocks 2 and 3 in pair are joined to each other with screws (not shown) with their spring holder fixing plates 5 held to abut each other and a spacer 6 is placed between the magnetic heads 10. Here the magnetic head assembly 1 according to the first embodiment of the present invention is finished.

The magnetic head assembly 1 constructed as having been described in the foregoing consists of the magnetic head 10 including the plurality of magnetic head elements 12 disposed in the direction perpendicular to the running direction of the magnetic tape 100. Therefore, the magnetic head assembly 1 can write and/or read data from many tracks on the magnetic tape 100 at the same time.

Also, this magnetic head assembly 1 includes so many connection terminals 13 to 16 as the magnetic head elements 12. The first to fourth connection terminals 13 to 16 are disposed on the head support 11 at large intervals. So, the electrical isolation between the two successive ones of the first to fourth connection terminals 13 to 16 can be assured and the first contact portions 21a to 24a of the first to fourth conductive spring members 21 to 24 can be electrically connected to the first to fourth connection terminals 13 to 16, respectively, in an appropriate and simple manner.

In this magnetic head assembly 1, the connection terminals 13 to 16 of the magnetic head 10 are electrically connected to the wiring patterns 46, respectively, on the first to fourth wiring boards 41 to 44 via the first to fourth conductive spring members 21 to 24, respectively. Thus, the electrical connection can be attained in a positive and simple manner.

In the magnetic head assembly 1, since the first to fourth conductive spring members 21 to 24 are supported by the spring holder 30, they can be electrically isolated from each other and the neighboring ones of them can be prevented from being electrically short-circuited to each other due to a contact between them.

Thus, the magnetic head elements 12 of the magnetic head 10 included in he magnetic head assembly 1 can be electrically connected to an external circuit (not shown) in an appropriate and simple manner.

Figure 16:
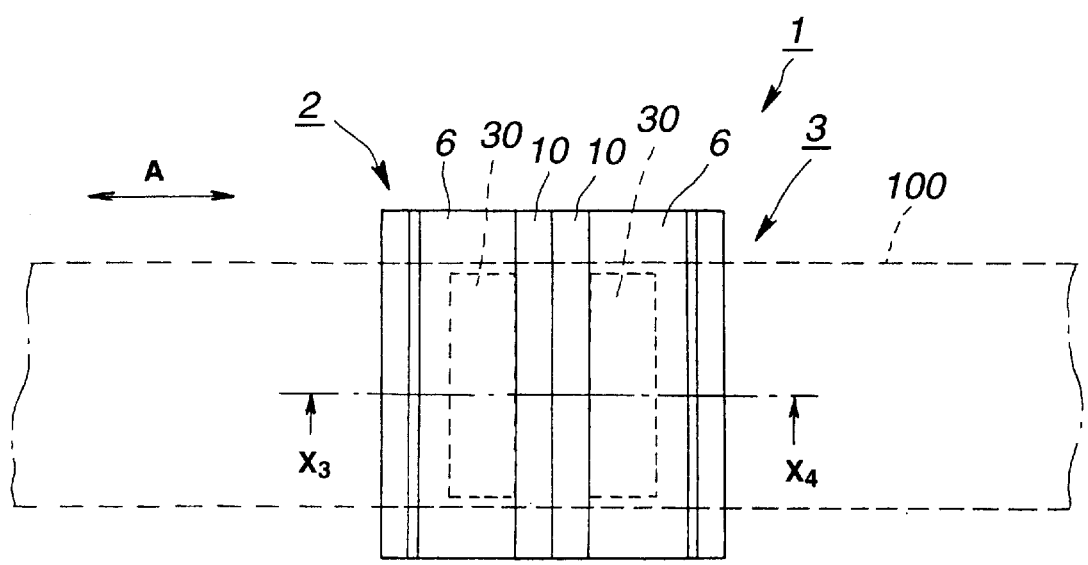
FIG. 16 is a plan view of a variant of the magnetic head assembly according to the present invention.
Figure 17:
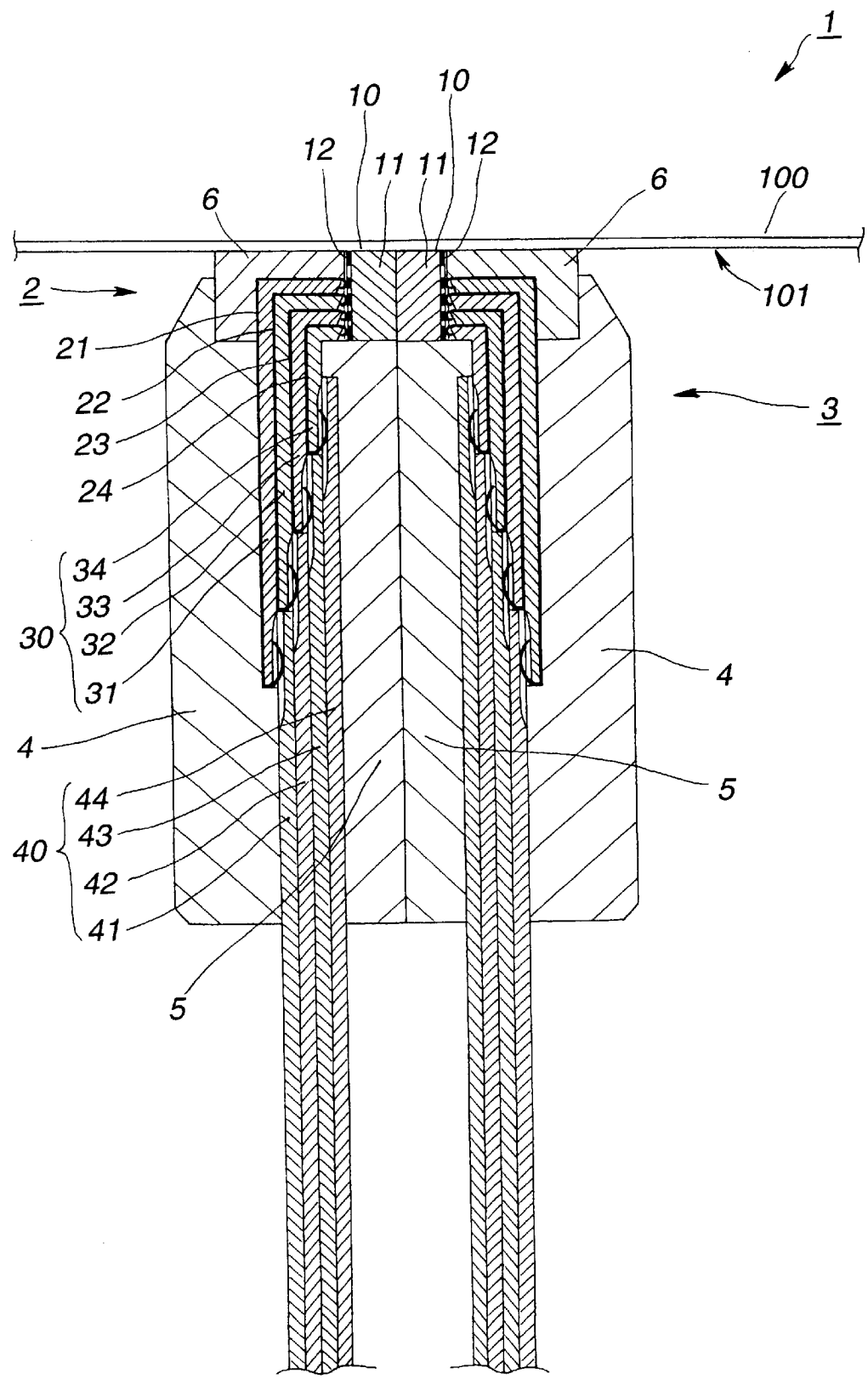
FIG. 17 is an axial-sectional view of the magnetic head assembly, taken along the line $X_3$–$X_4$ in FIG. 16.

In the foregoing, there has been described the magnetic head assembly 1 in which the right and left half blocks 2 and 3 in pair are disposed with a predetermined space between them with the magnetic heads 10 of the right and left half blocks 2 and 3 in pair being supported in their respective frames 4 and the right and left half blocks 2 and 3 in pair being thus joined to each other. However, the present invention is not limited to the magnetic head assembly 1 but the magnetic head assembly 1 may be adapted such that the magnetic heads 10 are placed in proximity to each other when the magnetic heads 10 of the right and left half blocks 2 and 3 in pair are supported in their respective spring holders 5 and the half blocks 2 and 3 in pair are thus joined to each other, as shown in FIGS. 16 and 17.

Figure 18:
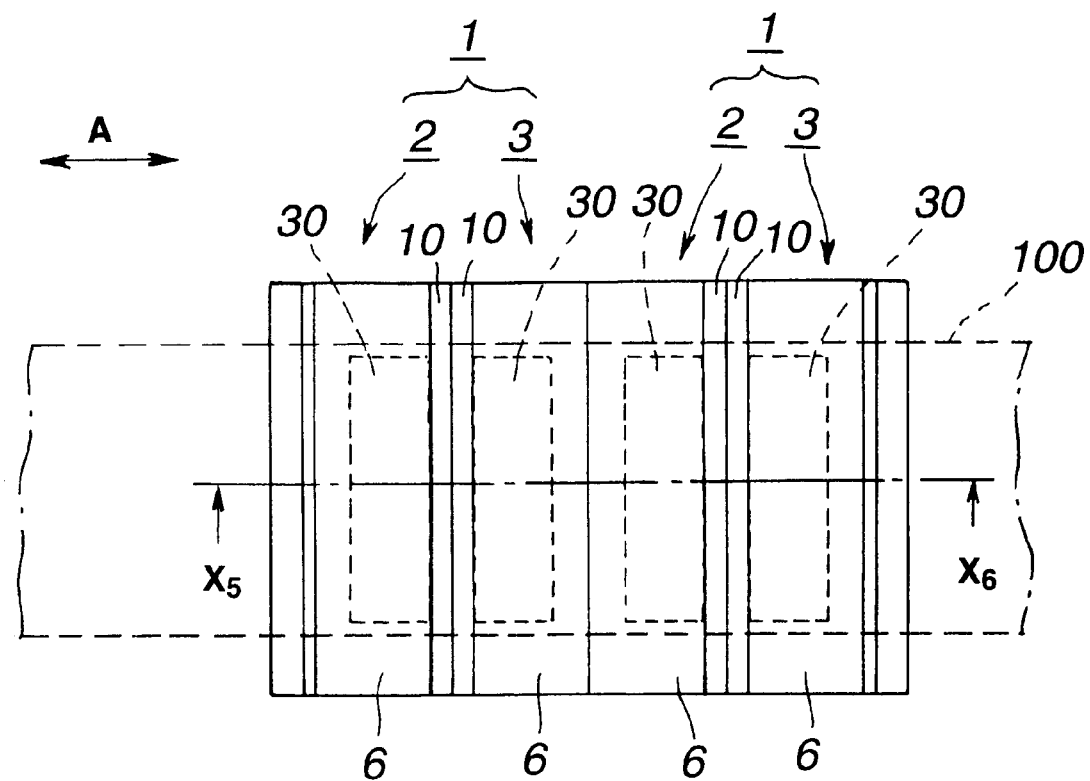
FIG. 18 is a plan view of another variant of the magnetic head assembly according to the present invention.
Figure 19:
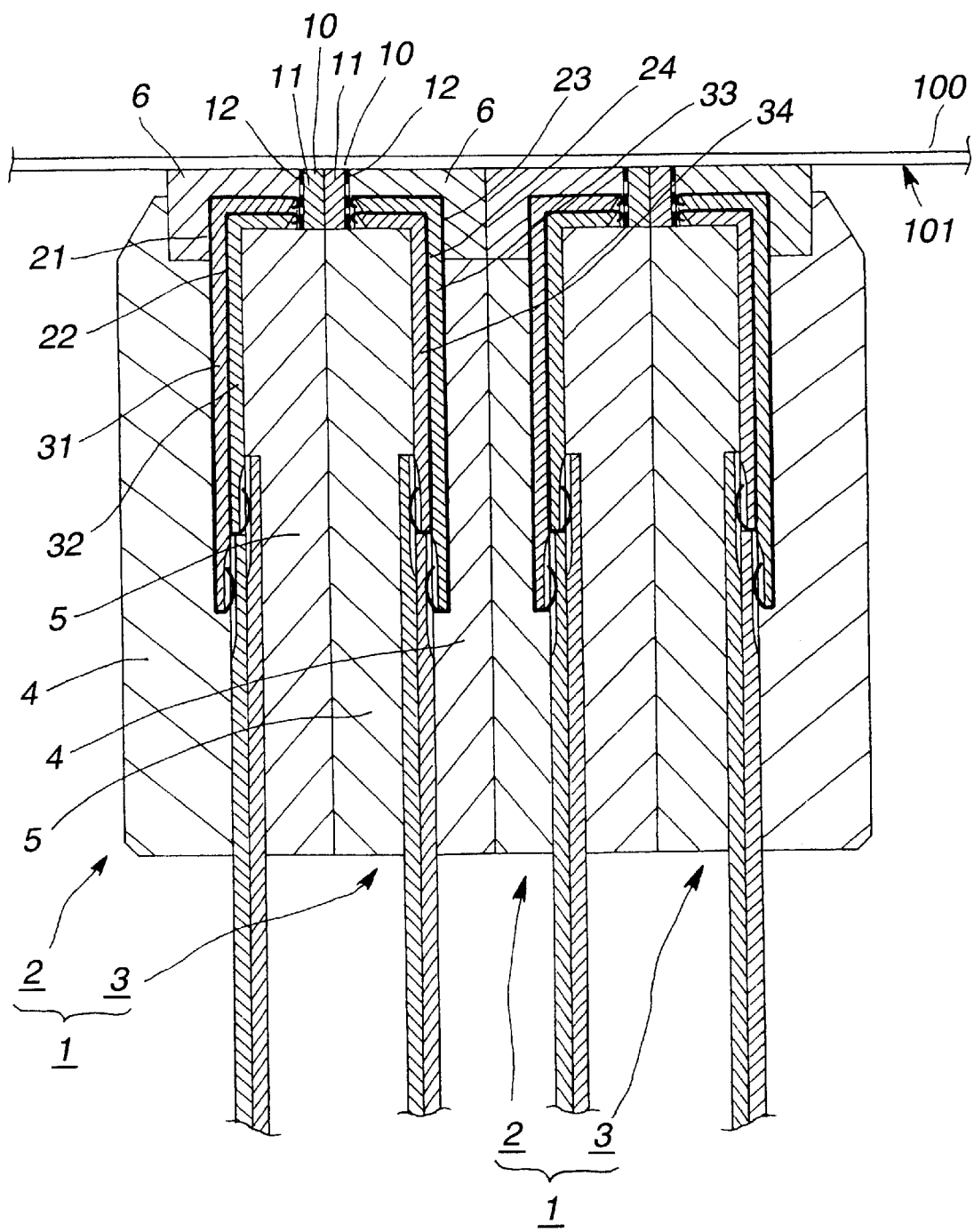
FIG. 19 is an axial-sectional view of the magnetic head assembly, taken along the line $X_5$–$X_6$ in FIG. 18.

As shown in FIGS. 18 and 19, the magnetic head assembly 1 may include a write magnetic head element provided in the magnetic head 10 in one of the right and left half blocks 2 and 3 in pair and a read magnetic head element provided in the other half block. However, the magnetic head assembly 1 thus modified will be able to write and/or read data to and/or from only a half of the tracks in the aforementioned magnetic head assembly simultaneously. To avoid this, two pieces of such a magnetic head assembly 1 should preferably be disposed side by side and joined to each other. In this case, since two connection terminals are provided for each of the magnetic head elements, the spring holder 30 is formed from two supporting members laminated together and the wiring board assembly 40 is formed from two wiring boards laminated together.

<Second embodiment>

Figure 20:
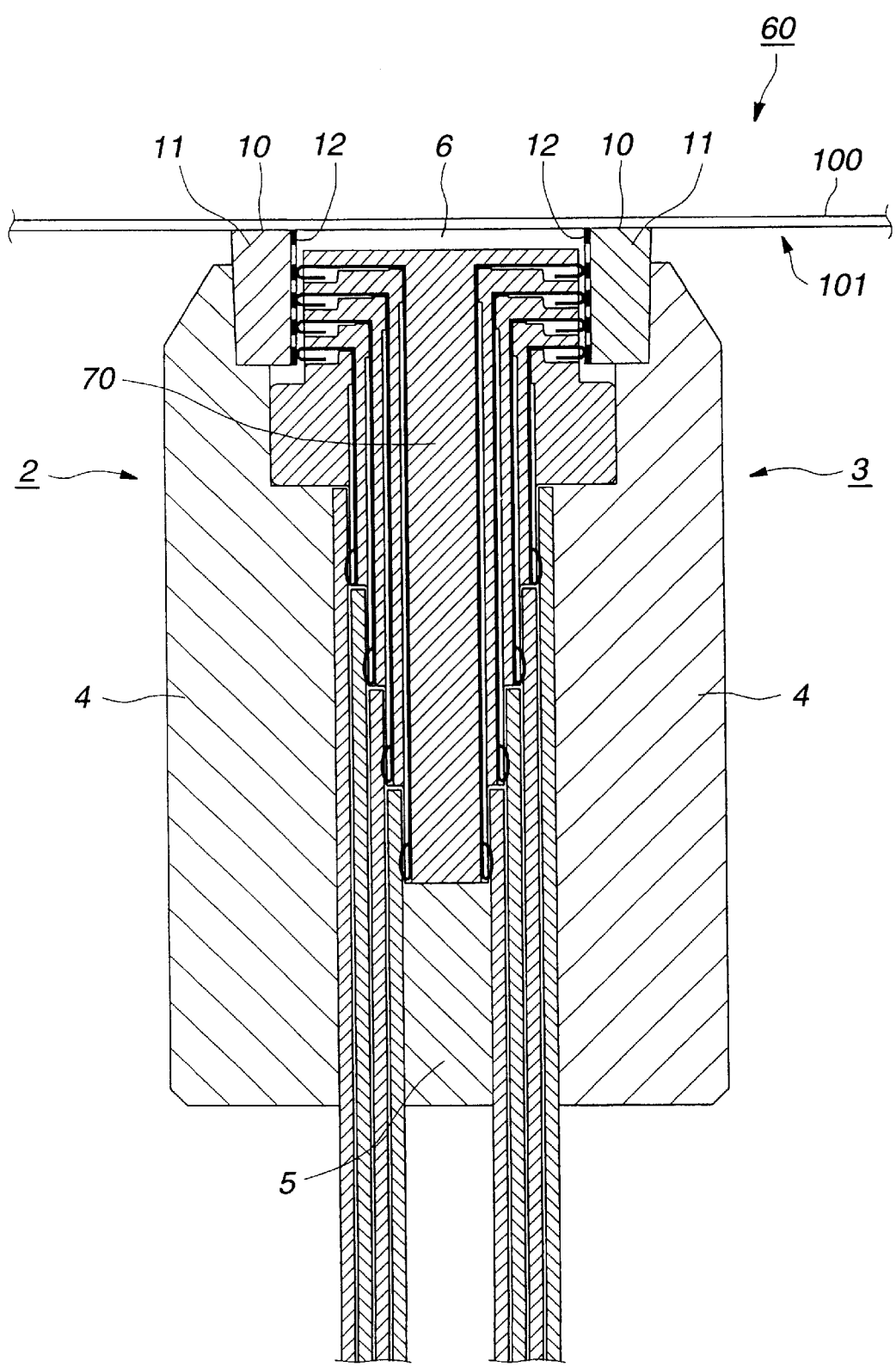
FIG. 20 is an axial-sectional view of a second embodiment of the magnetic head assembly according to the present invention.
Figure 21:
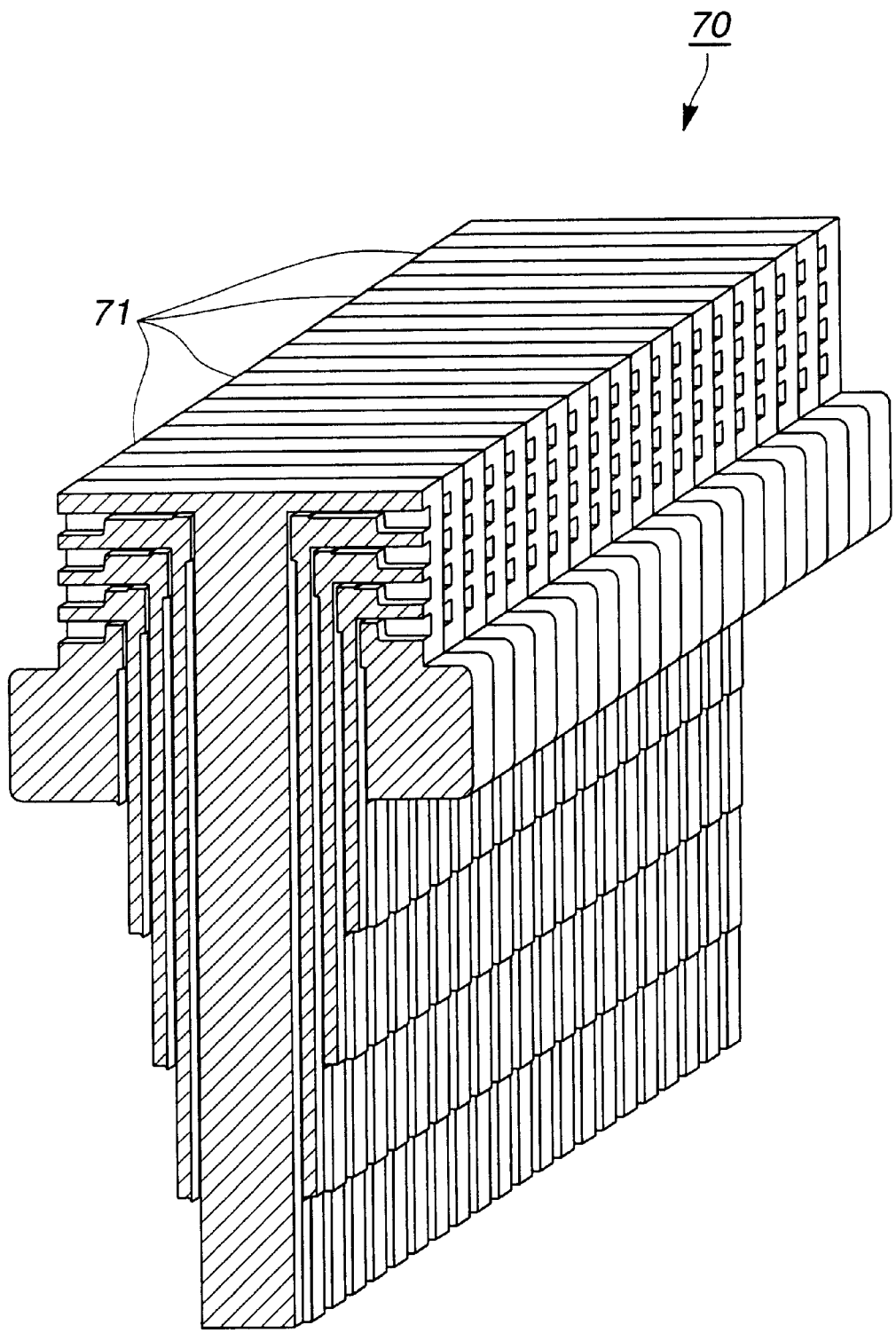
FIG. 21 is a perspective view of the spring holder included in the magnetic head assembly in FIG. 20.

Next, a second embodiment of the magnetic head assembly according to the present invention will be described with reference to FIGS. 20 to 22. The same elements as those in the first embodiment are indicated with the same reference numerals in FIGS. 20 to 22 and so they will not be described any further.

The magnetic head assembly according to the second embodiment is generally indicated with a reference 60. As shown in FIG. 20, the basic construction of the second embodiment is similar to that of the first embodiment having been described in the foregoing. The right and left half blocks 2 and 3 in pair share one spring holder 70. The magnetic head assembly 60 is characterized in that the spring holder 70 is formed from a plurality of supporting members 71 laminated together to support together the first to fourth conductive spring members 21 to 24 provided for one magnetic head element 12. That is, the spring holder 70 of the magnetic head assembly 1 includes so many supporting members 71 to support together the first to fourth conducive spring members 21 to 24 as the magnetic head elements 12 as shown in FIG. 21. The supporting members 71 are laminated together to form the spring holder 70.

Figure 22:
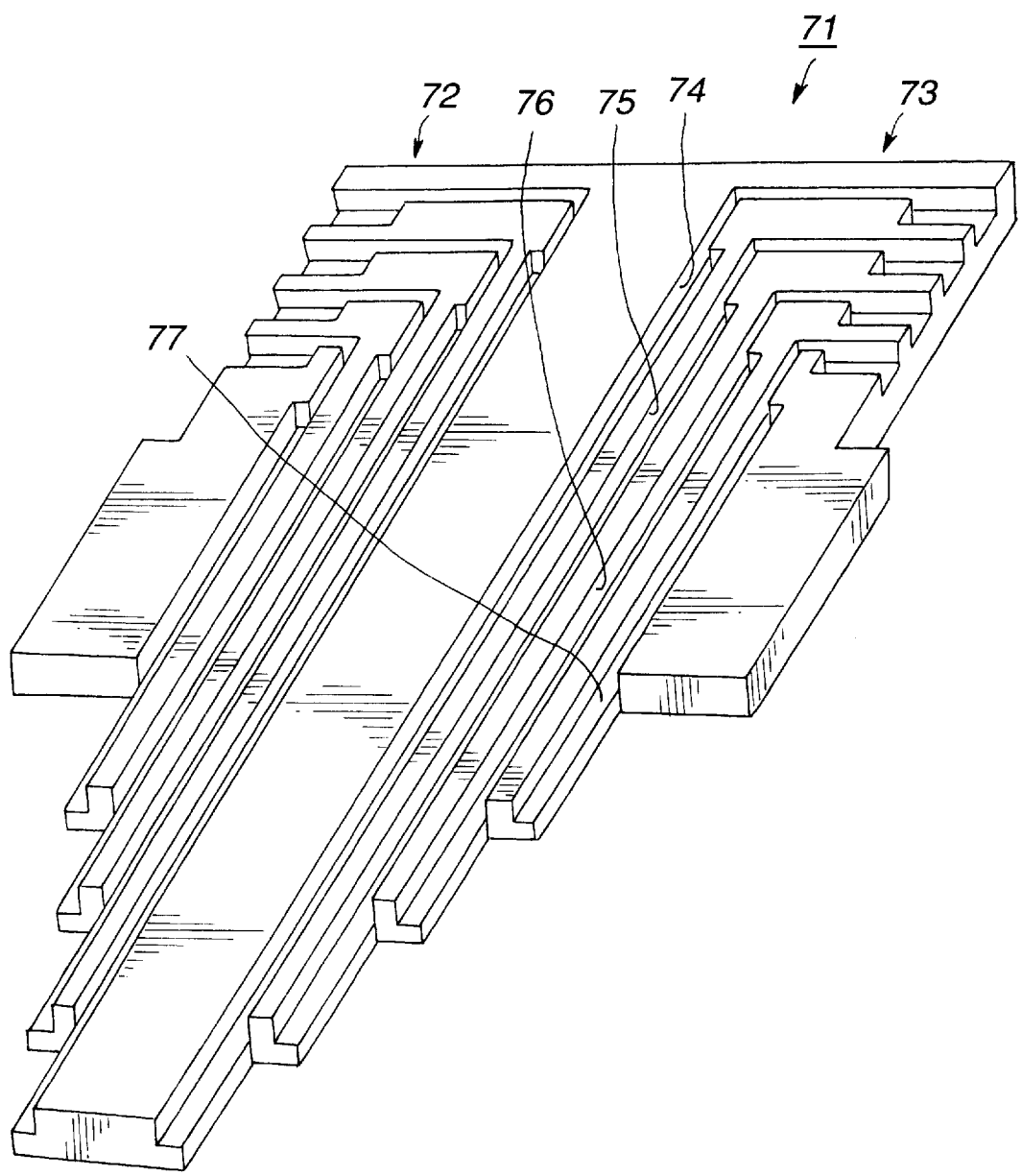
FIG. 22 is a perspective view of the supporting member composing the spring holder in FIG. 20.

The supporting members 71 forming the spring holder 70 are made of a highly insulative material such as synthetic resin, glass, ceramic, etc. and formed to have a generally T-like shape as shown in FIG. 22.

More specifically, each of the supporting members 71 consists of a first supporting portion 72 to support the first to fourth conductive spring members 21 to 24 provided for the magnetic head elements in one of the right and left half blocks 2 and 3 in pair, and a second supporting portion 73 to support the first to fourth conductive spring members 21 to 24 provided for the magnetic head elements 12 in the other half block.

Each of the first and second supporting portions 72 and 73 of the supporting member 71 has formed therein a first recess 74 in which the first conductive spring member 21 is received, a second recess 75 in which the second conductive spring member 22 is received, a third recess 76 in which the third conductive spring member 23 is received, and a fourth recess 77 in which the fourth conductive spring member 24 is received. The recesses are shaped correspondingly to the conductive spring members 21 to 24, respectively.

With the first to fourth conductive spring members 21 to 24 being received in the first to fourth recesses 74 to 77, respectively, formed in each of the first and second supporting portions 72 and 73, the supporting member 71 assures an electrical isolation between the neighboring conductive spring members and supports these conductive spring members together.

Each of the supporting members 71 forming together the spring holder 70 is formed to have a thickness nearly equal to the pitch P1 of the plurality of magnetic head elements 12 provided on the head support 11 in the direction across the magnetic tape 100. With the first to fourth conductive spring members 21 to 24 being received in the first to fourth recesses 74 to 77, respectively, formed in each of the first and second supporting portions 72 and 73, these supporting members 71 are laminated one on another in the direction of thickness of the spring holder 70 as shown in FIG. 21. Thus, all the conductive spring members 21 to 24 of the magnetic head assembly 60 are supported together by the spring holder 70 formed from the laminated supporting members 71 in such a manner as to assure the electrical isolation between the neighboring conductive spring members.

Then, the distribution of the first contact portions 21a to 24a of the first to fourth conductive spring members 21 to 24 supported by the spring holder 70 coincides with that of the first to fourth connection terminals 13 to 16 disposed on the head support 11. So, when the first contact portions 21a to 24a of all the conductive spring members 21 to 24 supported by the spring holder 70 are forced to the first to fourth connection terminals 13 to 16, respectively, disposed on the head support 11 at the same time, all the conductive spring members 21 to 24 can be electrically connected together to the first to fourth connection terminals 13 to 16, respectively.

Also, the distribution of the second contact portions 21b to 24b of the first to fourth conductive spring members 21 to 24 supported by the spring holder 70 coincides with that of the first terminal portions 47 of the wiring patterns 46 of the wiring board assembly 40 formed from the first to fourth wiring boards 41 to 44 laminated together. So, when the second contact portions 21b to 24b of all the conductive spring members 21 to 24 supported by the spring holder 70 are forced to the first terminal portions 47, respectively, of the wiring patterns 46 of the wiring board assembly 40 at the same time, all the conductive spring members 21 to 24 can be electrically connected together to the first terminal portions 47, respectively, of the wiring patterns 46 of the wiring board assembly 40.

<Third embodiment>

In the aforementioned magnetic head assemblies 1 and 60 according to the first and second embodiments, respectively, when a larger number of magnetic head elements 12 are provided on the head support 11, the pitch P1 of the magnetic head elements 12 becomes very small. In this case, the pitch of the wiring patterns 46 formed on each of the first to fourth wiring boards 41 to 44 is also very small. If the pitch of the wiring patterns 46 is thus very small, an extremely high precision is required for forming the wiring patterns, which will make it difficult to form the wiring patterns 46. Also a high precision is required for assembling the wiring board assembly 40 into the magnetic head assembly 1, which will make the assembling difficult.

Figure 23:
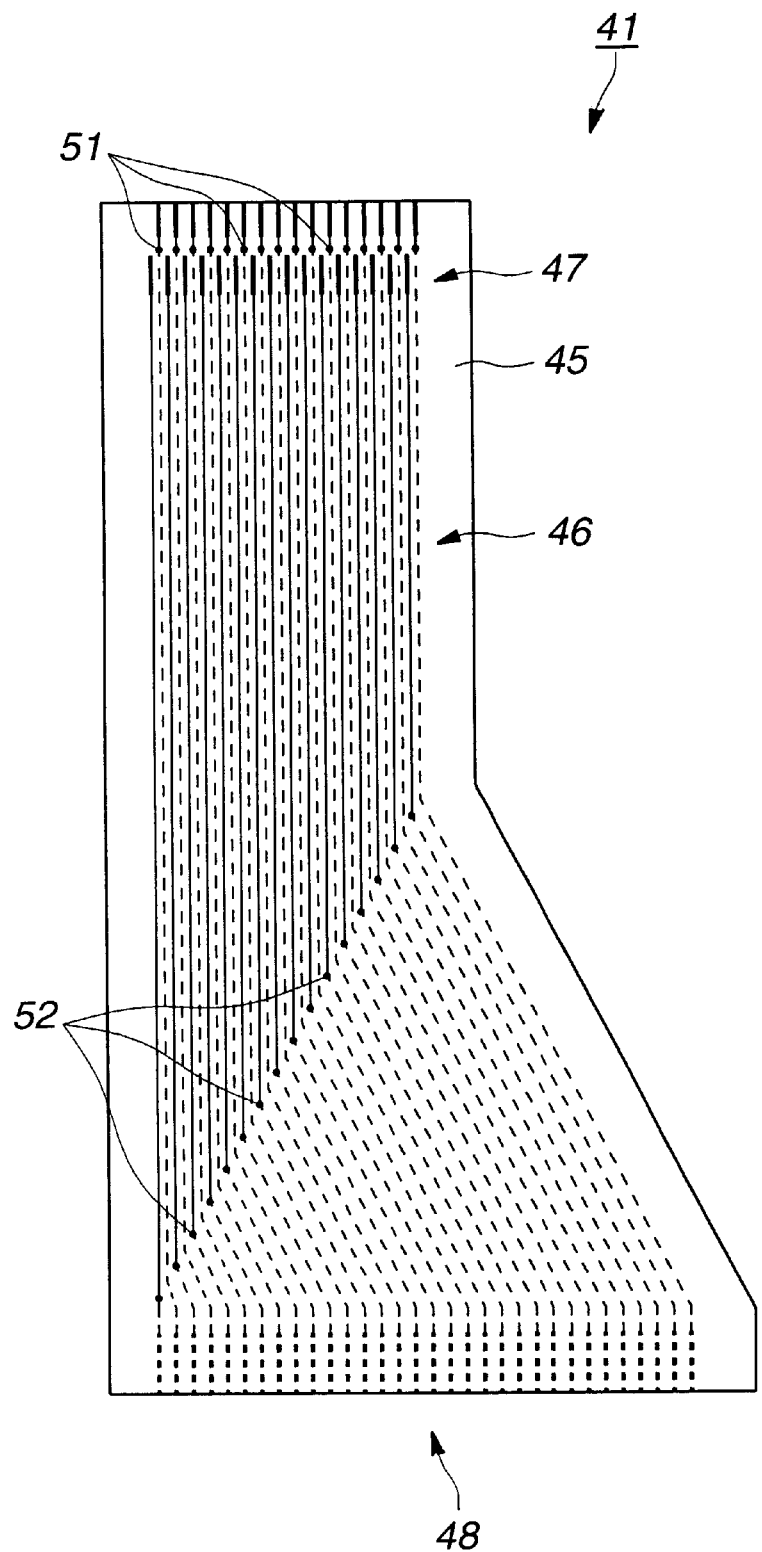
FIG. 23 is a plan view of the wiring board included in a third embodiment of the magnetic head assembly according to the present invention.
Figure 24:
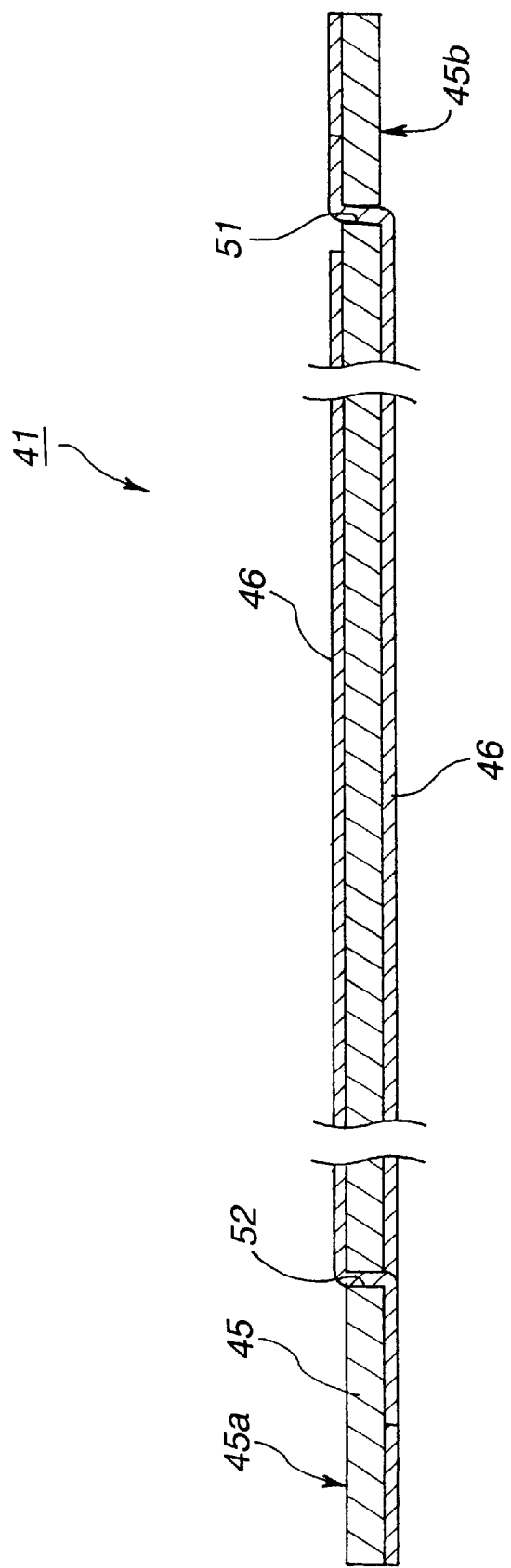
FIG. 24 is a sectional view of the wiring board in FIG. 23.

To make it easy to form the wiring patterns 46 and to assemble the wiring board assembly 40 into the magnetic head assembly 1 even when a great number of magnetic head elements 12 are provided on the head support 11, the present invention provides a third embodiment as will be described herebelow. The wiring board assembly 40 in the magnetic head assembly according to the third embodiment includes first to fourth wiring boards 41 to 44 constructed as shown in FIGS. 23 and 24. The first to fourth wiring boards 41 to 44 are designed to be identical in shape to each other, and so only the first wiring board 41 will be described herebelow.

Similarly to the wiring boards included in the magnetic head assemblies 1 and 60 according to the first and second embodiments, respectively, of the present invention, the wiring board 41 has a highly insulative substrate 45 on which there are formed as many wiring patterns 46 as the magnetic head elements 12 provided on the head support 11.

More specifically, the substrate 45 of the wiring board 41 consists of a parallel plate widened at the middle thereof and gradually increased in width as it goes away from the parallel portion. So many wiring patterns 46 as the magnetic head elements 12 are provided to extend from the narrow end of the substrate 45 to the wide end. The wiring patterns 46 have first terminal portions 47 at the narrow end portion of the substrate 45. The first terminal portions 47 are formed on one main surface 45a of the substrate 45. The second contact portions 21b of the conductive spring members 21 are to abut the first terminal portions 47, respectively. Further, the wiring patterns 46 have second terminal portions 48 at the wide portion of the substrate 45. The second terminal portions 48 are formed on the other main surface 45b of the substrate 45. They are to be connected to an external circuit (not shown).

In the wiring board 41 of the magnetic head assembly according to the third embodiment, one of the neighboring wiring patterns 46 is led from the one main surface 45a of the substrate 45 to the other main surface 45b via a through-hole 52 formed in the middle or other end portion of the substrate 45. That is, one of the neighboring wiring patterns 46 on the wiring board 41 is formed on the other main surface 45b of the substrate 45, extending from the one to other end of the substrate 45, while the other wiring pattern 46 is formed on the one main surface 45a of the substrate 45, extending from the one end to the middle or other end of the substrate 45.

In this wiring board 41, the space between the neighboring wiring patterns 46 is larger than that in the aforementioned magnetic head assembly 1 or 60 according to the first or second embodiment of the present invention, respectively. More specifically, in the range of the substrate 45 from the through-hole 51 to the through-hole 52, the space between the neighboring wiring patterns 46 on the wiring board 41 is two times larger than that in the magnetic head assembly 1 or 60 according to the first or second embodiment, that is, the space or pitch P1 between the neighboring magnetic head elements 12 formed on the head support 11.

Owing to the large space between the neighboring wiring patterns 46, a large number of magnetic head elements 12 can be provided on the head support 11. Even if the increased number of the magnetic head elements 12 leads to a correspondingly increased number of wiring patterns 46 formed in the substrate 45, it is possible to prevent an interference between the neighboring wiring patterns 46 and thus an electrical short-circuit between them.

Even in case a large number of magnetic head elements 12 are provided on the head support 11 in the magnetic head assembly according to the third embodiment in which the wiring patterns 46 are formed in the wiring board 41 with an increased space or pitch between the neighboring ones, the wiring patterns 46 can be formed easily and the wiring board assembly 40 can be assembled simply, in comparison with the magnetic head assemblies 1 and 60 according to the first and second embodiments of the present invention.

In the wiring board 41 included in the magnetic head assembly according to the third embodiment of the present invention, the first terminal portion 47 of one of the neighboring wiring patterns 46 which extends over the one main surface 45a of the substrate 45 should preferably be formed nearer to the other end portion of the substrate 45 than the through-hole 51 formed in the one end portion. By forming the first terminal portion 47 of the wiring pattern 46 extending on the one main surface 45a of the substrate 45 nearer to the other end portion of the substrate 45 than the through-hole 51 formed in the one end portion as in the above, it is possible to effectively prevent an interference between the first terminal portions 47 of the neighboring wiring patterns 46 and thus an electrical short-circuit between the first terminal portions 47.

In the wiring board 41 constructed as in the above, the distance between the first to fourth connection terminals 13 to 16 of the magnetic head 10 and the first terminal portions 47 of the wiring patterns 46 will vary from one of the neighboring wiring patterns 46 to the other. By varying the length of the first to fourth conductive spring members 21 to 24 supported by the spring holder 30, more specifically, the lengths L5, L6, L7 and L8 of the second straight portions 21*d* to 24*d*, respectively, of the first to fourth conductive spring members 21 to 24, correspondingly to the distance between the first to fourth connection terminals 13 to 16 and the first terminal portions 47 of the wiring patterns 46, for each of the conductive spring members connected to the neighboring wiring patterns 46, respectively, the first to fourth connection terminals 13 to 16 can be connected securely to the first terminal portions 47, respectively, of the wiring patterns 46 by the first to fourth conductive spring members 21 to 24, respectively.

What is claimed is:

1. A magnetic head assembly comprising:
    a magnetic head including:
        a head support disposed opposite to a signal recording surface of a magnetic tape which is to be moved sliding on the head support;
        a number m (m is an integer equal to or larger than 2) of magnetic head elements disposed on the head support in a direction across the magnetic tape, with a part thereof being opposite to the signal recording surface of the magnetic tape; and
        a number n (n is an integer equal to or larger than 2) of connection terminals disposed on the head support, for each of the m magnetic head elements, in a direction perpendicular to the signal recording surface of the magnetic tape, to electrically connect the magnetic head elements to an external;
    a number n of wiring boards each having a number m of wiring patterns formed thereon for the m magnetic head elements of the magnetic head;
    a number m×n of conductive spring members each having a first contact portion formed at one end thereof and which is to abut a corresponding one of the connection terminals of the magnetic head and a second contact portion formed at the other end thereof and which is to abut a corresponding one of the wiring patterns on the wiring board, to thereby provide an electrical connection between the connection terminal of the magnetic head and the wiring pattern on the wiring board; and
    a spring supporting member to support the m×n conductive spring members in such a manner that the neighboring conductive spring members are electrically isolated from each other.

2. The magnetic head assembly as set forth in claim 1, wherein there is formed a recess in a place on the wiring board where there lies the one end of the wiring pattern the second contact portion of the conductive spring member abuts.

3. The magnetic head assembly as set forth in claim 1, comprising a plurality of the above-mentioned magnetic heads.

4. The magnetic head assembly as set forth in claim 1, wherein in the magnetic head, a composite magnetic head element formed by laminating together a magnetic induction type magnetic head element and a magneto-resistance effect type magnetic head element, is used as each of the magnetic head elements.

5. The magnetic bead assembly as set forth in claim 1, wherein the spring supporting member is formed by laminating a number n of portions which support at least a number n of conductive spring members together.

6. The magnetic head assembly as set forth in claim 5, wherein the thickness of each of the n portions of the spring supporting member is nearly equal to the distance between the connection terminals disposed in the direction perpendicular to the signal recording surface of the magnetic tape.

7. The magnetic head assembly as set forth in claim 1, wherein the spring supporting member is formed by laminating a number m of portions which support at least a number n of conductive spring members together.

8. The magnetic head assembly as set forth in claim 7, wherein the thickness of each of the m portions of the spring supporting member is nearly equal to the distance between the magnetic head elements disposed in the direction across the signal recording surface of the magnetic tape.

9. The magnetic head assembly as set forth in claim 1, wherein the conductive spring member forces the first contact portion thereof to the connection terminal of the magnetic head to elastically deform and put the first contact portion into contact with the connection terminal while forcing the second contact portion to the wiring pattern on the wiring board to elastically deform and put the second contact portion into contact with the wiring pattern.

10. The magnetic head assembly as set forth in claim 1, wherein the conductive spring member to be connected to one of the n connection terminals of the magnetic head at which the signal recording surface of the magnetic tape is received by the magnetic head element, is longer than the conductive spring member to be connected to one of the connection terminals at which the signal recording surface of the magnetic tape leaves the magnetic head element.

11. The magnetic head assembly as set forth in claim 1, wherein the conductive spring member to be connected to the connection terminal corresponding to one of the magnetic head elements disposed adjacent to each other, is different in length from the conductive spring member to be connected to the connection terminal corresponding to the other magnetic head element.

12. The magnetic head assembly as set forth in claim 1, wherein the spring supporting member has formed therein a plurality of recesses corresponding to the conductive spring members which the spring supporting member supports;
    the conductive spring members being received in the respective recesses in such a manner that only the first and second contact portions can be moved.

13. The magnetic head assembly as set forth in claim 1, wherein one of the neighboring wiring patterns formed on the wiring board extend from one to the other end thereof on one main side of the wiring board while the other is led at the middle portion thereof to the other main side of the wiring board via a through-hole formed in the wiring board.

14. The magnetic head assembly as set forth in claim 1, wherein the space between the wiring patterns formed on the wiring board is larger at one end of the wiring pattern the second contact portion of the conductive spring member is to abut than the other end.

* * * * *